US011960447B2

(12) United States Patent
Zadina et al.

(10) Patent No.: US 11,960,447 B2
(45) Date of Patent: Apr. 16, 2024

(54) OPERATING SYSTEM-LEVEL MANAGEMENT OF MULTIPLE ITEM COPY AND PASTE

(71) Applicant: GOOGLE LLC, Mountain View, CA (US)

(72) Inventors: Gabrielle Zadina, San Francisco, CA (US); Kejia Shao, Santa Clara, CA (US); Gary Hyun Jin Kim, San Mateo, CA (US); Alex Newcomer, Sunnyvale, CA (US); David Black, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/247,940

(22) Filed: Dec. 31, 2020

(65) Prior Publication Data

US 2022/0206995 A1 Jun. 30, 2022

(51) Int. Cl.
*G06F 17/00* (2019.01)
*G06F 3/04812* (2022.01)
*G06F 3/04842* (2022.01)
*G06F 16/14* (2019.01)
*G06F 16/16* (2019.01)

(52) U.S. Cl.
CPC ........ *G06F 16/168* (2019.01); *G06F 3/04812* (2013.01); *G06F 3/04842* (2013.01); *G06F 16/148* (2019.01)

(58) Field of Classification Search
CPC .. G06F 16/168; G06F 16/148; G06F 3/04812; G06F 3/04842
See application file for complete search history.

(56) References Cited

U.S. PATENT DOCUMENTS

| | | | | |
|---|---|---|---|---|
| 7,818,458 | B2* | 10/2010 | Andersen | G06F 9/543 709/248 |
| 9,710,147 | B2* | 7/2017 | Kwon | G06F 9/543 |
| 10,417,320 | B2* | 9/2019 | Fairweather | G06F 40/166 |
| 10,489,032 | B1* | 11/2019 | Margolin | G06F 21/6245 |
| 10,599,380 | B2* | 3/2020 | Sarkar | G06F 3/1454 |
| 10,627,993 | B2* | 4/2020 | Worley | G06F 3/0486 |
| 10,783,012 | B2* | 9/2020 | Abuelata | G06F 3/04817 |

(Continued)

OTHER PUBLICATIONS

International Search Report and Written Opinion for PCT Application No. PCT/US2021/072933, dated Mar. 14, 2022, 11 pages.

(Continued)

*Primary Examiner* — Mohammed H Zuberi
(74) *Attorney, Agent, or Firm* — Brake Hughes Bellermann LLP

(57) ABSTRACT

Systems and methods are described that include in response to detecting a copy operation or a cut operation associated with a content item, triggering a search of data associated with the content item, the search configured to determine a content type and triggering, based on a detected paste operation generation of a representation of the content item based on the content type and rendering of a clipboard history user interface with the content item rendered in the clipboard history user interface according to the representation, the content item being rendered with other content items rendered in the clipboard history user interface.

32 Claims, 19 Drawing Sheets

(56) References Cited

U.S. PATENT DOCUMENTS

| | | | |
|---|---|---|---|
| 10,949,272 B2* | 3/2021 | Chen | G06F 9/543 |
| 11,099,865 B2* | 8/2021 | Ma | G06F 9/451 |
| 11,132,115 B1* | 9/2021 | Brown | G06F 40/166 |
| 11,321,153 B1* | 5/2022 | Kwatra | G06F 7/26 |
| 2004/0226012 A1* | 11/2004 | Awada | G06F 3/04855 |
| | | | 715/201 |
| 2007/0079249 A1* | 4/2007 | Pall | G06F 9/546 |
| | | | 715/758 |
| 2009/0083738 A1* | 3/2009 | Kruglick | G06F 16/24564 |
| | | | 718/100 |
| 2010/0083092 A1* | 4/2010 | Schuller | G06F 40/18 |
| | | | 707/E17.058 |
| 2013/0346491 A1* | 12/2013 | Margolin | H04L 67/10 |
| | | | 709/203 |
| 2014/0075354 A1* | 3/2014 | Ko | G06F 3/0486 |
| | | | 715/769 |
| 2014/0160049 A1* | 6/2014 | Shin | G06F 9/543 |
| | | | 345/173 |
| 2014/0280132 A1* | 9/2014 | Auger | G06F 9/543 |
| | | | 707/736 |
| 2015/0012861 A1* | 1/2015 | Loginov | G06F 9/543 |
| | | | 715/770 |
| 2015/0012862 A1* | 1/2015 | Ikeda | G06F 40/174 |
| | | | 715/770 |
| 2015/0026620 A1* | 1/2015 | Kwon | G06F 3/04886 |
| | | | 715/770 |
| 2015/0207850 A1* | 7/2015 | Jitkoff | H04W 4/21 |
| | | | 709/219 |
| 2015/0363069 A1* | 12/2015 | Okamoto | G06F 3/0488 |
| | | | 345/156 |
| 2015/0370764 A1* | 12/2015 | Huo | G06F 9/44 |
| | | | 715/239 |
| 2016/0216862 A1* | 7/2016 | Turner | G06Q 10/107 |
| 2016/0342449 A1* | 11/2016 | Wong | H04L 67/1097 |
| 2017/0185241 A1* | 6/2017 | Angermayer | G06F 9/451 |
| 2017/0294212 A1* | 10/2017 | Allen | G11B 27/34 |
| 2018/0004312 A1* | 1/2018 | Lee | G06F 3/04886 |
| 2018/0039385 A1* | 2/2018 | Worley | G06F 3/0486 |
| 2018/0181553 A1* | 6/2018 | Fairweather | G06F 3/04842 |
| 2019/0065016 A1* | 2/2019 | Vasudev | G06F 16/252 |
| 2019/0384657 A1* | 12/2019 | Chen | G06F 9/451 |
| 2021/0042171 A1* | 2/2021 | Shah | G06F 9/543 |
| 2021/0055854 A1* | 2/2021 | Fan | G06F 3/04886 |
| 2021/0232448 A1* | 7/2021 | Yu | G06F 3/0482 |

OTHER PUBLICATIONS

"Clipboard Manager—Wikipedia", https://en.wikipedia.org/w/index/php?title=Clipboard_manager&oldid=994393780, Dec. 15, 2020, 4 pages.

Stylos, et al., "Citrine: Providing Intelligent Copy-and-Paste", UIST '04, Oct. 24-27, 2004, 4 pages.

* cited by examiner

Checkout: sign in

```
┌─────────────────────────┐
│         304             │
│  925292020              │
│  Account data ********  │
│  Linda's Itinerary Times.doc │
│                         │
│  Clipboard History UI   │
└─────────────────────────┘
```

Sign in • Passengers • Seats • Payment • Confirmation

I have an account

Log in to your account to access your saved information

User ID or MP  Forgot user ID?

925292020

Password    forgot password?

How to:
Use My wallet funds
To apply you're my wallet funds to your purchase, first sign in to your account 925292020
306

☐ Remember my user ID on this computer©,

SIGNIN

View and paste multiple copied items from your clipboard. Press Launcher⊕+ V to open clipboard
302

9/7
MON

Airline and flight #83719　402
SFO to JFK

| Depart | Airport | Confirmation | Notes |
| --- | --- | --- | --- |
| 7:10AM 404 | SFO | ABC123 406 | Nonstop flight; 6hrs 408 |
| Arrive | | | |
| 3:55PM 410 | JFK | | |

Copy Command(s) 412

The Hotel　Washington Street, Greenwich Village

| Check-in | Nights | Confirmation | Notes |
| --- | --- | --- | --- |
| 5:00PM | 3 | 123ABC | |

9/8

Day1

OPERATING SYSTEM-LEVEL MANAGEMENT OF MULTIPLE ITEM COPY AND PASTE

BACKGROUND

Conventional clipboard applications may provide access to a most recent copied text. For example, a user may use a command to copy text to generate the most recent copied text in the clipboard. When the most recent copied text is processed by the clipboard application, a user may use a command to paste the text. In response to receiving the paste command, the most recent copied text may be imported into a user-selected application program. Such conventional clipboard applications may be accessed without the use of an application user interface (e.g., they may be accessed through keyboard shortcuts).

SUMMARY

The systems and methods described herein may function to manage an enhanced clipboard history by generating a clipboard history user interface (UI) such that a user may access, modify, and/or simultaneously transfer multiple content items from one application (e.g., app, document, online app, or online document, etc.) to another such application. For example, the systems and methods described herein may generate and store a deeper clipboard than a conventional operating system clipboard. One example of a deeper clipboard can include multiple previously captured content items including, but not limited to, screenshot content, download content, copy content, cut content, online content, document content, or portions thereof.

The clipboard history UI can be used to quickly transfer multiple content items (e.g., text, links, images, files, etc.) from one application to another application. For example, a user may select (e.g., cut, copy) two or more content items from a first application to generate the selected content on a clipboard history UI and may subsequently transfer (e.g., paste, drag, etc.) the selected content items into another application (or webpage) by copying content while in the first application and later selecting the content from the clipboard history UI when in the second application without having to move back and forth between applications multiple times in order to capture and paste the multiple stored content items. The advantages of this approach can be further recognized in respect of touchscreen devices such as smartphones or tablets, for example, where multiple user inputs can be required to switch between different applications.

In addition, the systems and methods described herein can configure the multiple items of the clipboard history UI to be visually presented in such a way as to indicate to the user the particular visual content of each content item. For example, the systems and methods described herein may receive a cut or copy operation (e.g., command) for a content item and may generate a view of the content item for the clipboard history user interface. The view may take into account file type, file contents, image content, html or text content, metadata, and the like. By visually presenting (or providing) a representative view of the content item, the user may be better able to distinguish between multiple items of the clipboard history UI. In some implementations, the systems and methods described herein can provide a user a way in which to preview content items as the items would be shown if a paste operation were to be received. The technical advantages of this approach can be further be recognized in regard to mobile computing devices, which often have small screen sizes or otherwise have limited screen 'real estate'. By displaying a representative view of a content item, a user may better distinguish between multiple content items without needing to zoom in or otherwise adjust the display area; some of the limitations inherent in the use of small display screens of mobile computing devices may therefore be overcome.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In a first general aspect, a computer-implemented method is described that includes in response to detecting a copy operation or a cut operation associated with a content item, triggering a search of data associated with the content item where the search configured to determine a content type. The method may also include triggering, based on a detected paste operation: generation of a representation of the content item based on the content type, and rendering of a clipboard history user interface with the content item rendered in the clipboard history user interface according to the representation where the content item is rendered with other content items rendered in the clipboard history user interface.

Implementations can include any or all of the following features. In some implementations, generating a representation of the content item based on the content type includes generating a text representation of the content item, in response to determining that the data associated with the content item does not include at least one table tag or at least one image tag and generating a tagging language representation of the content item, in response to determining that the data associated with the content item includes at least one table tag or at least one image tag.

In some implementations, the rendering of the clipboard history user interface includes rendering a representation of each of multiple sets of content items according to the content type determined for each content item in the multiple sets of content items. In some implementations, the content item and the other content items are grouped in the clipboard history user interface according to a temporal proximity of the copy operation or the cut operation and a time period associated with capture of the content item or the other content items. In some implementations, the content item and the other content items are grouped in the clipboard history user interface according to a detected object represented in the content item or the other content items.

In some implementations, the method may further include detecting a cursor at an input field and determining that the input field corresponds to at least one content item in the clipboard history user interface. In some implementations, triggering the rendering of the clipboard history user interface includes providing the rendered clipboard history user interface as an element adjacent to the input field, the rendered clipboard history user interface including the at least one content item marked for suggestion as input into the input field.

In some implementations, generating the representation of the content item based on the content type includes determining whether to zoom or clip a portion of the content item and performing the zoom or clip of the portion of the content item to generate a scaled version of the content item in the rendered clipboard history user interface, in response to detecting tagging language information associated with the content item.

In some implementations, the method may further include in response to detecting an input on at least one rendered content item in the rendered clipboard history user interface, generating a preview of the at least one rendered content item, the preview including a rendering that simulates a paste operation for the at least one content item. In some implementations, the clipboard history user interface is configured to include content items retrieved from two or more user profiles associated with a user with access to the clipboard history user interface. In some implementations, the clipboard history user interface is configured to enable multi-item operations, the multi-item operations including a multi-item copy operation, a multi-item paste operation, and a multi-item rendering operation, each of the multi-item operations configured to be triggered by a single input detected at the rendered clipboard history user interface.

In some implementations, the method may further include detecting a second paste operation associated with the clipboard history user interface and overwriting the content item associated with the second paste operation in response to detecting that the content item is marked private, wherein the overwriting obfuscates the content item when rendering the content item in an application receiving the second paste operation.

In some implementations, the method may further include detecting a copy operation associated with the clipboard history user interface, overwriting preview data associated with the detected copy operation in response to detecting that the preview data is marked private and where the overwriting obfuscates a preview of the data depicted in the clipboard history user interface. The method may also include rendering the clipboard history user interface with the overwritten preview data instead of rendering at least one content item corresponding to the preview data.

In some implementations, the method may include, for each subsequent detected copy operation or cut operation associated with a respective content item, triggering a search of data associated with the respective content item, the search of data configured to determine whether the data includes at least one tag, generating a respective representation of the respective content item based on the search of data, and triggering rendering of the clipboard history user interface with each respective content item rendered according to the respective representation. In some implementations, the content item and each respective content item are rendered using a single browser process that generates an operating-system based virtual digital clipboard configured to represent the content item and each respective content item rendered in the clipboard history user interface.

In a second general aspect, a non-transitory computer-readable storage medium is described that includes instructions stored thereon that, when executed by at least one processor, are configured to cause a computing system to at least generate a clipboard history user interface, the clipboard history user interface configured to render a plurality of content items and in response to detecting a copy operation or a cut operation associated with a content item trigger a search of data associated with the content item, the search configured to determine a content type, and generate a representation of the content item based on the content type. The instructions may also include triggering rendering of the clipboard history user interface with the content item rendered in the clipboard history user interface according to the representation where the content item is rendered with other content items rendered in the clipboard history user interface, wherein the content item and the other content items are grouped together in the clipboard history user interface.

Implementations can include any or all of the following features. In some implementations, the rendering of the clipboard history user interface occurs in response to detection of a paste operation. In some implementations, the instructions further include generating a representation of the content item based on the content type which include generating a text representation of the content item, in response to determining that the data associated with the content item does not include at least one table tag or at least one image tag and generating a tagging language representation of the content item, in response to determining that the data associated with the content item includes at least one table tag or at least one image tag.

In some implementations, the instructions are further configured to cause the computing system to detect a cursor at an input field, determine that the input field corresponds to at least one content item in the clipboard history user interface. Triggering the rendering of the clipboard history user interface may include providing the rendered clipboard history user interface as an element adjacent to the input field, the clipboard history user interface including the at least one content item marked for suggestion as input into the input field.

In some implementations, the search of data associated with the content item includes retrieving, from a buffer associated with the clipboard history user interface, tagging language information associated with the content item and determining whether the tagging language information includes at least one table tag or at least one image tag and generating the representation of the content item based on the content type includes determining whether to zoom or clip a portion of the content item and performing the zoom or clip of the portion of the content item to generate a scaled version of the content item in the rendered clipboard history user interface, in response to determining that the tagging language information includes at least one table tag or at least one image tag.

In some implementations, the instructions are further configured to cause the computing system to generate a preview of the at least one rendered content item, in response to detecting an input on at least one rendered content item in the rendered clipboard history user interface where the preview includes a rendering that simulates a paste operation for the at least one content item. In some implementations, the clipboard history user interface is configured to include content items retrieved from two or more user profiles associated with a user with access to the clipboard history user interface. In some implementations, the clipboard history user interface is configured to enable multi-item operations, the multi-item operations including a multi-item copy operation, a multi-interface item paste operation, and a multi-item rendering operation, where each of the multi-item operations are configured to be triggered by a single input detected at the rendered clipboard history user.

In some implementations, the instructions are further configured to cause the computing system to detect a copy operation associated with the clipboard history user interface, overwrite preview data associated with the detected copy operation in response to detecting that the preview data is marked private, wherein the overwriting obfuscates a preview of the data depicted in the clipboard history user interface, and render the clipboard history user interface with the overwritten preview data instead of rendering at least one content item corresponding to the preview data.

In some implementations, the instructions are further configured to cause the computing system to, for each subsequent detected copy operation or cut operation associated with a respective content item, trigger a search of data associated with the respective content item, the search of data configured to determine whether the data includes at least one table tag or at least one image tag, and generate a respective representation of the respective content item based on the search of data, and trigger rendering of the clipboard history user interface with each respective content item rendered according to the respective representation. In some implementations, the content item and each respective content item are rendered using a single operating system process that generates an operating-system based virtual digital clipboard configured to store, track, populate, and update the content item and each respective content item rendered in the clipboard history user interface.

In a third general aspect, a system may include memory and at least one processor coupled to the memory where the at least one processor is configured to utilize a clipboard module and a rendering module. The clipboard module may be configured to generate a clipboard history user interface, the clipboard history user interface configured to render a plurality of content items and in response to detecting a copy operation or a cut operation associated with a content item trigger a search of data associated with the content item, the search configured to determine a content type and generate a representation of the content item based on the content type.

The rendering module may be configured to trigger rendering of the clipboard history user interface with the content item rendered in the clipboard history user interface according to the representation where the content item is rendered with other content items rendered in the clipboard history user interface, wherein the content item and the other content items are grouped together in the clipboard history user interface.

Implementations can include any or all of the following features. In some implementations, the clipboard module is further configured to detect a cursor at an input field and determine that the input field corresponds to at least one content item in the clipboard history user interface. Triggering the rendering of the clipboard history user interface may include providing the rendered clipboard history user interface as a menu adjacent to the input field, the clipboard history user interface including the at least one content item marked for suggestion as input into the input field.

In some implementations, generating the representation of the content item based on the content type includes determining whether to zoom or clip a portion of the content item and performing the zoom or clip of the portion of the content item to generate a scaled version of the content item in the rendered clipboard history user interface, in response to detecting tagging language information is associated with the content item.

In some implementations, the rendering module may be further configured to generate a preview of at least one rendered content item, in response to detecting an input on at least one rendered content item in the rendered clipboard history user interface where the preview includes a rendering that simulates a paste operation for the at least one content item.

In some implementations, the clipboard history user interface is configured to include content items retrieved from two or more user profiles associated with a user with access to the clipboard history user interface. In some implementations, the clipboard history user interface is configured to enable multi-item operations, the multi-item operations including a multi-item copy operation, a multi-item paste operation, and a multi-item rendering operation, where each of the multi-item operations are configured to be triggered by a single input detected at the rendered clipboard history user interface.

In some implementations, the clipboard module may be further configured to detect a second paste operation associated with the clipboard history user interface and trigger overwriting of the content item associated with the second paste operation in response to detecting that the content item is marked private, where the overwriting obfuscates the content item when rendering the content item in an application receiving the second paste operation.

The systems and aspects above may be configured to perform any combination of the above-described aspects, each of which may be implemented together with any suitable combination of the above-listed features and aspects.

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

FIG. 3 is a screenshot illustrating a UI trigger to use the clipboard history UI, in accordance with implementations described herein.

FIG. 4 is an example screenshot illustrating copying of multiple content items to the clipboard history UI while remaining within an application, in accordance with implementations described herein.

FIG. 5 is an example screenshot illustrating provision and use of the clipboard history UI within an application, in accordance with implementations described herein.

The use of similar or identical reference numbers in the various drawings is intended to indicate the presence of a similar or identical element or feature.

DETAILED DESCRIPTION

Figure 1:
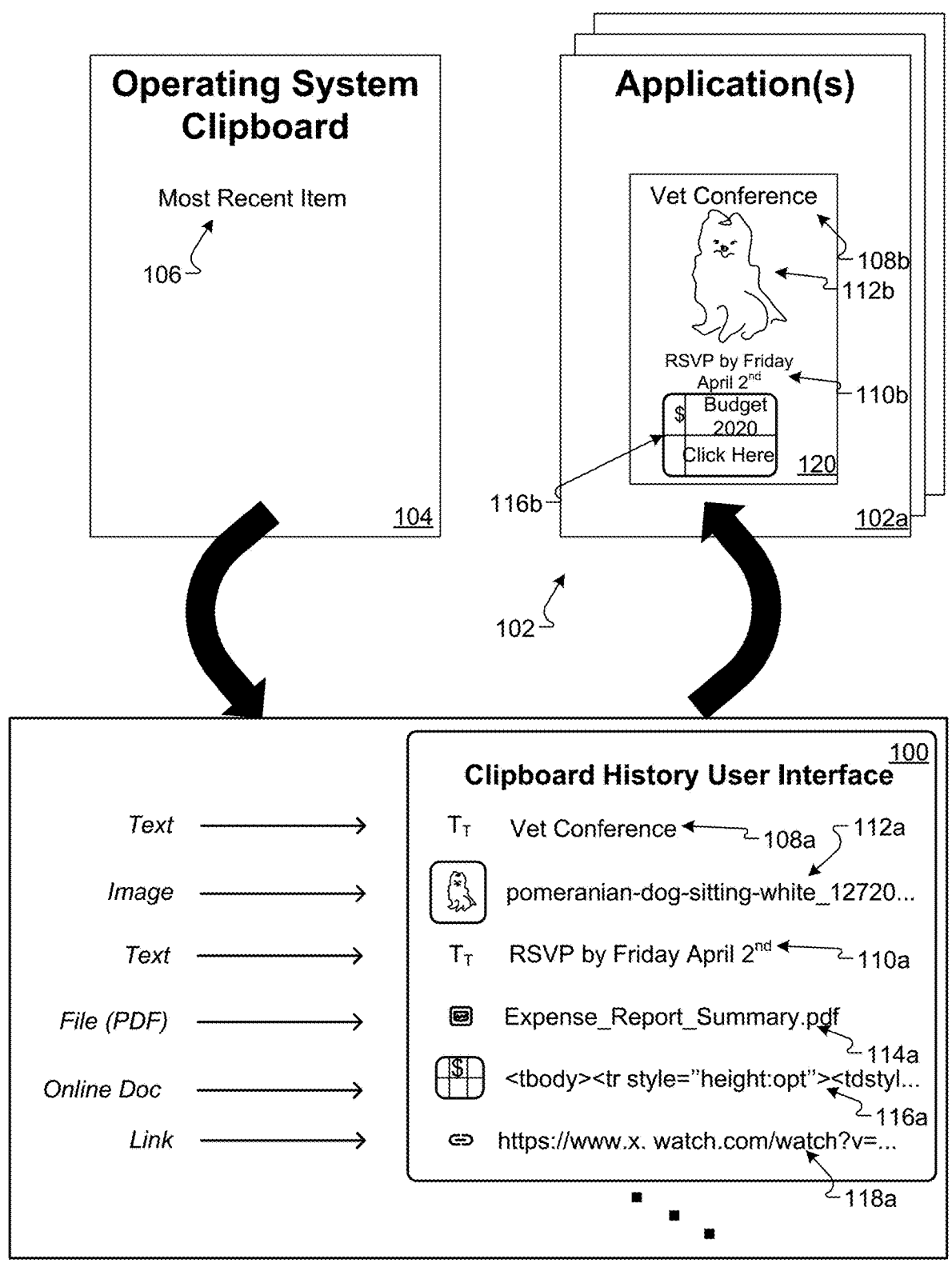
FIG. 1 is a block diagram illustrating an example use of a clipboard history user interface (UI), in accordance with implementations described herein.

This document describes a clipboard history user interface (UI) for visually rendering (or displaying) captured content items. The captured content items may be modified to provide an accurate portrayal of a type associated with such content items and the content within such content items. For example, if a content item includes a portion of an online spreadsheet, the systems and methods described herein can curate a version of the portion to provide a user with visual information of what the content item represents. The generated version of a particular content item is then rendered in the clipboard history UI for future user selection and use.

In some implementations, the clipboard history UI may represent a visual content item copy history that may assist a user in quickly identifying previously copied content. The clipboard history UIs described herein may enable a user to understand the contents in a multi-item copy history, unlike conventional systems which provide a single content item in the copy history and such an item may not be visible until a user performs a paste operation. Thus, the systems and methods described herein provide an advantage of rendering a preview of captured content items within a clipboard history UI in order to enable user recognition of each particular content item in the clipboard history UI.

The clipboard history UIs described herein allow a user to view and use the captured content items while remaining in the context of a current application session. Such a UI can enable multi-item copy and paste operations using selections and/or shortcuts associated with the UI. For example, the clipboard history UI may allow a user to copy and/or paste multiple items into an application without having to minimize, maximize, or move between application windows and the clipboard history UI because the clipboard history UI may be pinned, floating, or otherwise attached to a portion of a current application session or O/S session. This can reduce user inputs in switching between different applications. In some implementations, when a user presents a shortcut, the clipboard history UI is depicted at an input field or cursor to allow the user to quickly select one or more content items to be pasted into an active application, for example. In some implementations, the clipboard history UI may generate and provide suggested content items for user selection at the input field for purposes of populating the input field.

In operation, the systems and methods described herein can generate the clipboard history UI as an O/S-level UI surface that provides a visual clipboard history which may be used to quickly transfer multiple content items (e.g., text, markup, images, or other content) while avoiding repetitive data entry (e.g., multiple copy/paste operations). The clipboard history UIs described herein may assist users to access a deeper clipboard (e.g., the last five things copied) than conventional systems to quickly transfer multiple content items from one place to another. In addition, the clipboard history UIs described herein may alleviate the overwriting of content from a previous copy/cut operation because the clipboard history UIs retain more than one previously copied/cut content item.

In some implementations, the systems and methods described herein may leverage an O/S process via an operating system (O/S) to enable the O/S to generate and visually render HTML content (or XML, XHTML, TeX, SOAP, OWL, or other tagging/markup language content) in the clipboard history UI. The content may be rendered according to an analysis of (and/or a search related to) the content so that the content is presented to allow a user to identify the content at a glance. In addition, the O/S may use the O/S process to simulate, modify, and track content items in a non-rendered (e.g., non-visible) construct in order to manipulate and modify the actual clipboard UI history being rendered to the user according to the non-rendered content. This allows for standard copy and/or paste operations to be used with any or all of the multiple items in the clipboard history UI, regardless of the order in which each respective content item is populated in the clipboard history UI. As used herein, an O/S process may represent a browser process, a rendering process, a CPU process, and/or an application process and the like.

The systems and methods herein may solve the technical challenge (e.g., problem) of determining the contents of a clipboard history for a particular user or user session. For example, different scenarios utilize paste operations with formatting or paste operations without formatting (e.g., plain text). A system is needed to provide users with an accurate visual representation (e.g., zoom, stretch, clip, crop, image to link, link to image, text to markup, markup to text, etc.) of content items in a clipboard history to set user expectations of what exactly will be pasted upon the user providing a paste operation. This can have further advantages on devices with small display screens, where text size may make it difficult to easily distinguish between different content items. Conventional systems provide a default setting for copy and paste operations that the user may not view or otherwise be aware of a resulting paste operation before actually performing the paste operation to view the pasted content. The systems and methods described herein provide a technical solution to the technical problem by configuring the computer O/S to generate the clipboard history UIs described herein, which may enable the O/S to render the UI at a cursor, an input field, an overlay, etc., to allow for quick pasting of multiple content items. In some implementations, the UIs described herein may be managed in a single process that executes in the background to generate a non-visible clipboard with content (e.g., the last three, five, ten, etc. copied content items). The process can receive copy operations (for example, commands to copy content) to generate a visible clipboard history UI with the content items being able to be hot swapped, selected, etc. while the user may still utilize typical shortcuts (e.g., ctrl-v, enter, select, screenshot, snip), or other inputs to copy/paste any or all of the stored content items. The single process may continue to execute for a predetermined amount of time to provide the advantage of quick access and use of clipboard content items without having to wait to generate and execute a new process each time an operation (e.g., command) is received to use the clipboard content items. By reusing the single process, overall runtime and system memory use may be reduced. HTML content (or other tagging language content) may be analyzed when copied to the clipboard to determine how the HTML content should be rendered/presented to the user within the clipboard (e.g., checks for images/tables can result in determinations for how to render the HTML content as plain text or bitmap image or GIF). In some implementations, the single process is a browser process. In some implementations, the single process is a rendering process. In some implementations, the single process is an application process.

The technical solutions described herein may provide a technical effect of providing a content capture history UI (e.g., the clipboard history UI) at an O/S level that may be widely adapted to a variety of devices including small devices such as wearables and mobile devices as well as larger devices including laptops, desktops, etc. For such devices, the UIs described herein may provide an advantage of depicting a clipboard history at a cursor or selected input field, thus avoiding having to open a separate application or window. The UIs described herein may provide for faster access to a clipboard of content items than that of conventional clipboard systems because a single process (e.g., a single browser process) is utilized for any number of copy, paste, or copy and paste operations performed in a user session, thereby avoiding generation of multiple time consuming, and processing-heavy implementations of conventional systems that are typically triggered per received operation. Runtime and memory use may be therefore be reduced.

In some implementations, the systems and methods described herein may determine a logic pattern for particular content items in order to accurately visually render markup language content (e.g., tagging language content). Such determined patterns may pertain to the data within and/or stored for rendering the content items described herein. The patterns may be used to ensure an accurate and user-recognizable visual representation of a content item is presented to the user in the clipboard history UI. For example, to ensure that HTML content items (or other tagging language content items) may be accurately portrayed in the clipboard history UI, patterns in the data pertaining to the content item may be assessed. In some implementations, the systems described herein may detect (e.g., search for) patterns such as table tags and/or image tags in the data and may determine that the data pattern pertains to HTML content items (or other tagging language content items). In response, the systems described herein may determine to render such content items with tagging language formatting. In a similar fashion, the systems described herein may determine whether to render content items as plain text by detecting different patterns of the data (or detecting a lack of other specific patterns in the data) pertaining to a particular content item. Rendering items as plain text unless otherwise indicated can allow the process to be more resource efficient.

FIG. 1 is a block diagram illustrating an example use of a clipboard history user interface (UI) 100, in accordance with implementations described herein. The clipboard history user interface 100 may include any number of content items populated by a user during a user session. For example, a user may be accessing any number of applications 102 throughout a user session and may copy (e.g., capture, snip, etc.) content items into a clipboard, such as O/S clipboard 104. The UI 100 may represent a history of copied, cut, and/or downloaded content items and may visually represent copied, cut, or downloaded content items by performing an analysis of the content items.

In some implementations, the systems described herein may access and leverage content from the O/S clipboard 104 to generate the content items in the clipboard history UI 100. For example, the O/S of a computing device may leverage the O/S clipboard 104 in order to populate content into an example clipboard history UI 100. In some implementations, the systems described herein may instead access the operations associated with the O/S clipboard 104 to obtain copied content for populating the UI 100. For example, the content items may be accessed and placed on the UI 100 each time a copy or cut operation is completed. Thus, the O/S clipboard 104 is not altered or modified by the population of the UI 100, but the content utilized with the O/S clipboard 104 is used throughout a user session, for example. As shown, the O/S clipboard 104 includes a single most recent item 106. The item 106 may be a last captured (e.g., cut, copied, screenshot, snipped) content item that a user placed on the O/S clipboard 104.

By contrast, the example clipboard history UI 100 includes a number of content items stored as the user cuts, copies, and/or downloads the content items. The UI 100 may represent a universal clipboard that allows users to copy multiple items to clipboard storage (associated with a browser application, for example) in order to later easily access the multiple items for pasting into other documents and/or applications. In general, the universal clipboard represented as UI 100 is enabled by the O/S of a computing device.

As shown, the UI 100 includes various types of content. For example, the UI 100 includes text content item 108*a* and text content item 110*a*, image content item 112*a*, file content item 114*a*, online content item 116*a* (e.g., online stored documents), GIF or other animated content items, and link content item 118*a*. The text content item 108*a* and text content item 110*a* both include a unique text snippet that the user may have copied from another source (e.g., a document, a website, etc.). Image content item 112*a* includes an image captured or copied by the user at a previous time from another source outside of the UI 100. File content item 114*a* includes a portable data file indicating a portion of an expense report captured or copied at a previous time from another source outside of the UI 100. Online content item 116*a* includes an html link captured or copied by the user at a previous time from another source outside of the UI 100.

In operation of the systems described herein, a user may be accessing an application 102*a*, for example, to generate an electronic document representing an invite to an upcoming veterinarian conference. The user may have generated clipboard history user interface 100 during the session. To generate the invite, the user may open a document 120 in application 102*a* to begin pasting (or multi-item pasting) content into the document 120. As shown, the user selected content item 108*a*, content item 112*a*, and content item 110*a*, and content item 116*a* to respectively paste content into document 120, as shown by text 108*b*, text 110*b*, image 112*b*, and table 116*b*. While six content items are shown in UI 100, any number of content items may be provided. For example, a particular UI 100 may restrain the number of content items to five. In some implementations, the UI 100 may store five to fifteen content items. In some implementations, the UI 100 may store fewer than five content items. In some implementations, the UI 100 may store all copied content over a particular time period resulting in presentation of hundreds of scrollable content items, for example.

Figure 2A:
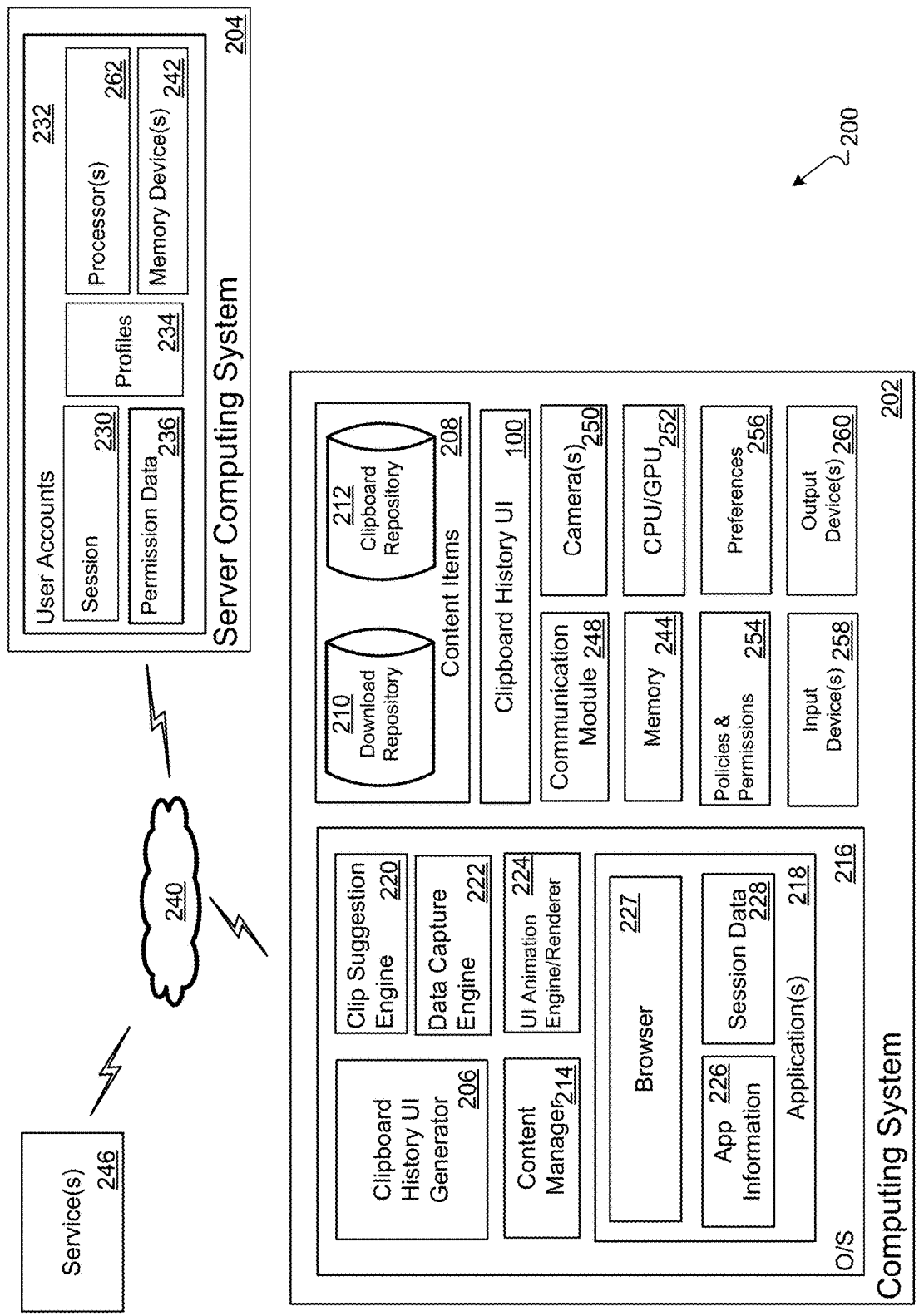
FIGS. 2A-2C are block diagrams illustrating an example computing system configured to generate and populate a clipboard history UI, in accordance with implementations described herein

FIG. 2A is a block diagram illustrating an example computing system 200 configured to generate and populate a clipboard history UI, in accordance with implementations described herein. The system 200 may be used to configure computing devices (e.g., a computing system 202 and a server computing system 204), and/or other devices (not shown in FIG. 2) to operate the clipboard history UI 100. For example, system 200 may generate the clipboard history UI 100 using a clipboard history UI generator 206 from content items 208 such as download repository 210 and/or clipboard repository 212. In some implementations, the content items 208 may be obtained from a clipboard application associated with the computing system 202. In some implementations, the content items 208 may be obtained directly from a copy or cut operation. The content items 208 may be modified by a content manager 214, for example, in order to accurately depict visual UI data in the clipboard history UI 100.

As shown in FIG. 2, the computing system 202 includes an operating system (O/S) 216. The O/S 216 may execute and or otherwise manage applications 218, clipboard history UI generator 206, content manager 214, clip suggestion engine 220, data capture engine 222, and UI animation engine/renderer 224. The O/S 216 may function to execute and/or control applications, UI interactions, accessed services, and/or device communications that are not shown.

The applications 218 may be any type of computer program that can be executed/delivered by the computing system 202 (or server computing system 204 or via an external service). Applications 218 may provide a user interface (e.g., application window) to allow a user to interact with the functionalities of a respective application 218. The application window of a particular application 218 may display application data along with any type of controls such as menu(s), icons, widgets, etc. The applications 218 may include or have access to app information 226 and session data 228, both of which may be used to generate content and/or data and provide such content and/or data to the users and/or the O/S 216 via a device interface. The app information 226 may correspond with information being executed or otherwise accessed by a particular application 218. For example, the app information 226 may include text, images, control signals associated with input, output, or interaction with the application 218. In some implementations, the app information 226 may include download data from download repository 210 and/or clipboard data from clipboard repository 212. In some implementations, the app information 226 may include data associated with a particular application 218 including, but not limited to metadata, table tags, image tags, timestamp data, URL data, and the like. In some implementations, the applications 218 may include a browser 227. The browser 227 may be utilized by clipboard history UI generator 206 to configure content items 208 for presentation in clipboard history UI 100.

The session data 228 may pertain to a user session 230 with an application 218. For example, a user may access a user account 232 via a user profile 234 on or associated with the computing system 202, or alternatively via server computing system 204. Accessing the user account 232 may include providing a username/password or other type of authentication credential and/or permission data 236. A login screen may be displayed to permit the user to supply the user credentials, which, when authenticated, allows the user to access the functionalities of the computing system 202. The session may start in response to the user account 232 being determined as accessed or when one or more user interfaces (UIs) of the computing system 202 are displayed. In some implementations, a session and a user account may be authenticated and accessed using computing system 202 without communicating with server computing system 204.

In some implementations, the user profiles 234 may include multiple profiles for a single user. For example, a user may have a business user profile and a personal user profile. Both profiles may utilize the same clipboard history UI 100 in order to use content items stored from both user profiles. Thus, if a user has a browser session open with a professional profile and an online file or application open with a personal user profile, the clipboard history UI 100 may be used to store content items clipped, downloaded, cut, copied, etc., from both profiles. For example, the system 200 may provide the user a view of the clipboard history UI 100 where content items rendered in the UI 100 are retrieved from the two user profiles associated with a user with access to the clipboard history UI 100. This may facilitate a reduction in user inputs to perform copy/paste actions, as well as reducing the time required. Therefore, fewer system resources may be used.

During the session (and if authorized by the user), session data 228 is generated. The session data 228 includes information about session items used/enabled by the user during a particular computing session 230. The session items may include clipboard content, browser tabs/windows, applications (e.g., web applications, native applications), virtual desks, display states (or modes) (e.g., split screen, picture-in-picture, full screen mode, etc.), and/or other graphical control elements (e.g., files, windows, control screens, etc.). For example, during the session 230, a user may collect a number of downloads and/or screenshots. The session items can include the downloads and/or screenshots. Such session items may be stored for provision in the clipboard history UI 100, for example, for the length of the session. In some implementations, the session items may be stored longer than a length of a session based on a predetermined time period. For example, the session items may be stored, based on user permission data 236 for one week. In some implementations, the session items may be stored for the predetermined time period with the addition of a current session. For example, to avoid removing session items during a session, the O/S 216 may store the session items for the length of the predetermined time period unless a user is currently in a session, in which case, the O/S 216 may wait until the end of the session to remove items from the session items.

As the user launches, enables, and/or manipulates these session items on the user interface, session data 228 is generated. The session data may include an identification of which session item has been launched, configured, or enabled, window positions, window sizes, whether a session item is positioned in the foreground or background, whether a session item is focused or non-focused, the time in which the session items was used (or last used), and/or a recency or last appearance order of the session items. In some examples, the session data 228 may include session item assignment to a particular clipboard history UI and/or application navigation state (e.g., activity stack or other identification of a screen that the application is displaying).

In some examples, the session data 228 is transmitted, over a network 240, to the server computing system in which the data may be stored in memory 242 in association with the user account 232 according to user permission data 236 of the user at the server computing system 204. For example, as the user launches and/or manipulates a session item on the user interface, session data about the session items may be transmitted to the server computing system 204. In some implementations, session data 228 is instead (or also) stored within a memory device 244 on computing system 202.

The clipboard history UI generator 206 may generate content items for rendering in a clipboard history UI (e.g., clipboard history UI 100). The clipboard history UI generator 206 may perform searches, content item analysis, browser process initiation, and other processing activities to ensure content items are accurately and efficiently rendered within a particular chronological order in the clipboard history UI 100. For example, the generator 206 may determine whether particular content items are depicted in the UI 100 in plain text format, image formats, HTML (or other tagging/markup language) format, etc. In some implementations, the generator 206 may add formatting to content items. In some implementations, the generator 206 may remove formatting from content items.

For example, the clipboard history UI generator 206 may receive, from a user, a cut or copy or download operation for a particular content item. The generator 206 may trigger a search to be performed with the content item to retrieve tagging language information associated with the content item from a buffer associated with the clipboard history UI 100 (e.g., download repository 210 or clipboard repository 212 or another communicably coupled repository). The generator 206 may then determine whether the tagging language information includes at least one table tag or at least one image tag. For example, the content item may include content, metadata, or other associated data that may include table tags or image tags that indicate tagging language. In some implementations, metadata may be generated as a content item in UI 100 if, for example, the metadata includes icons or other identifying information that the user can use to identify the content item at a glance.

The generator 206 may then use the search results and the content item data or related data to generate a representation of the content item. The representation can correspond to or be associated with a tagging language content type (such as a table type, an image type, etc.), where the tagging language content type is selected based on one or more tags included in the respective tagging language information. In one example, the generator 206 may determine whether to zoom or clip or crop a portion of the content item based on what the content item is. For example, if the content item is a spreadsheet, the generator 206 may crop a portion of the spreadsheet that pertains to a title or column or row in order to give the user an idea of what the content item is when the user views the cropped rendering of the spreadsheet in the UI 100. In another example, other portions of the spreadsheet may instead be selected as a way to identify the spreadsheet. Upon determining how to represent the content item in a rendering in the UI 100, the generator 206 may perform the determined zoom or clip or crop of the portion of the content item to generate a scaled version of the content item in the rendered clipboard history UI 100. The performance of the zoom or clip or crop of the portion may be carried out in response to determining that the tagging language information is associated with the particular content item and includes at least one table tag or at least one browser or image tag. For example, if the spreadsheet is an online spreadsheet with HTML or other tagging/markup language content, the generator 206 may detect a table tag and may determine that the way to represent the spreadsheet in the UI 100 is to crop a portion of the information associated with the table tag. A content item representing a crop or portion of the spreadsheet is then generated. In some implementations, the content item may be configured to be rendered in the UI 100 as HTML or other tagging language regardless of the content type or content within the content item.

The clipboard history UI generator 206 may provide a benefit of a rendering of a visual confirmation of what the user would see if a paste operation is performed using the rendered content items. The clipboard history UI generator 206 may be configured to maintain the clipboard history UI 100 as a user accesses a session in computing system 202. For example, the generator 206 may be implemented by the O/S 216 which can use a browser process 264 to generate and maintain a virtual digital clipboard configured to store, track, populate, and update the content items and each respective content item rendered in the clipboard history UI 100, as further described with respect to FIG. 2C.

The content manager 214 may function to manage content items in clipboard history UI 100. The clip suggestion engine 220 may function to generate and provide suggestions of which content item to paste into forms, documents, or applications, from UI 100.

The data capture engine 222 may provide copy and paste operations via the O/S clipboard 104 and via the clipboard history UI 100. The engine 222 may store and map data to captured content items.

The UI animation engine/renderer 224 may be configured to provide the UI 100 in varying states depending on the mode of access, the applications in use, and/or based on user permissions 254 and preferences 256. For example, the UI animation engine/renderer 224 may render content, render animated content, and/or otherwise present information for computing system 202.

As shown in FIG. 2A, the O/S 216 may include or have access to services 246, a communication module 248, cameras 250, memory 244, and CPU/GPU 252. The computing system 202 may also include or have access to policies and permissions 254 and preferences 256. In addition, the computing system 202 may also include or have access to input devices 258, output devices 260.

The services 246 may include online storage, content item access, account session or profile access, permissions data access, and the like. In some implementations, the services 246 may function to replace server computing system 204 where the user information and accounts 232 are accessed via a service. Similarly, the clipboard history UI 100 may be accessed via services 246.

The cameras 250 may include one or more image sensors (not shown) that may detect changes in background data associated with a camera capture performed by computing system 202 (or another device in communication with computing system 202). The cameras 250 may include a rear-facing capture mode and a front-facing capture mode.

The computing system 202 may generate and/or distribute particular policies and permissions 254 and preferences 256. The policies and permissions 254 and preferences 256 may be configured by a device manufacturer of computing system 202 and/or by the user accessing system 202. Policies 254 and preferences 256 may include routines (i.e., a set of actions) that trigger based on an audio command, a visual command, a schedule-based command, or other configurable command. For example, a user may set up a particular UI to be displayed at particular times and in response, system 202 may display the UI at the configured times. Other policies 254 and preferences 256 may of course be configured to modify and or control content associated with system 202 configured with the policies and permissions 254 and/or preferences 256.

The input devices 258 may provide data to system 202, for example, received via a touch input device that can receive tactile user inputs, a keyboard, a mouse, a hand controller, a mobile device (or other portable electronic device), a microphone that can receive audible user inputs, and the like. The output devices 260 may include, for example, devices that generate content for a display for visual output, a speaker for audio output, and the like.

In some implementations, the computing system 202 may store particular application and/or O/S data in a repository. For example, downloads may be stored in the download repository 210 upon receiving a cut, clip, or copy operation from a user of system 202. Similarly, screenshots and clipped content items may be stored in the clipboard repository 212 upon receiving a cut, clip, or copy operation from a user of system 202.

The server computing system 204 may include any number of computing devices that take the form of a number of different devices, for example a standard server, a group of such servers, or a rack server system. In some examples, the server computing system 204 may be a single system sharing components such as processors 262 and memory 242. User accounts 232 may be associated with system 204 and session 230 configurations and/or profile 234 configurations according to user permission data 236 may be provided to system 202 at the request of a user of the user account 232, for example.

The network 240 may include the Internet and/or other types of data networks, such as a local area network (LAN), a wide area network (WAN), a cellular network, satellite network, or other types of data networks. The network 240 may also include any number of computing devices (e.g., computer, servers, routers, network switches, etc.) that are configured to receive and/or transmit data within network 240. Network 240 may further include any number of hardwired and/or wireless connections.

The server computing system 204 may include one or more processors 262 formed in a substrate, an operating system (not shown) and one or more memory devices 242. The memory devices 242 may represent any kind of (or multiple kinds of) memory (e.g., RAM, flash, cache, disk, tape, etc.). In some examples (not shown), the memory devices 242 may include external storage, e.g., memory physically remote from but accessible by the server computing system 204. The server computing system 204 may include one or more modules or engines representing specially programmed software.

In general, the computing devices 202 and 204 may communicate via communication module 248 and/or transfer data wirelessly via network 240, for example, amongst each other using the systems and techniques described herein. In some implementations, each system 202, 204 may be configured in the system 200 to communicate with other devices associated with system 200.

Figure 2B:
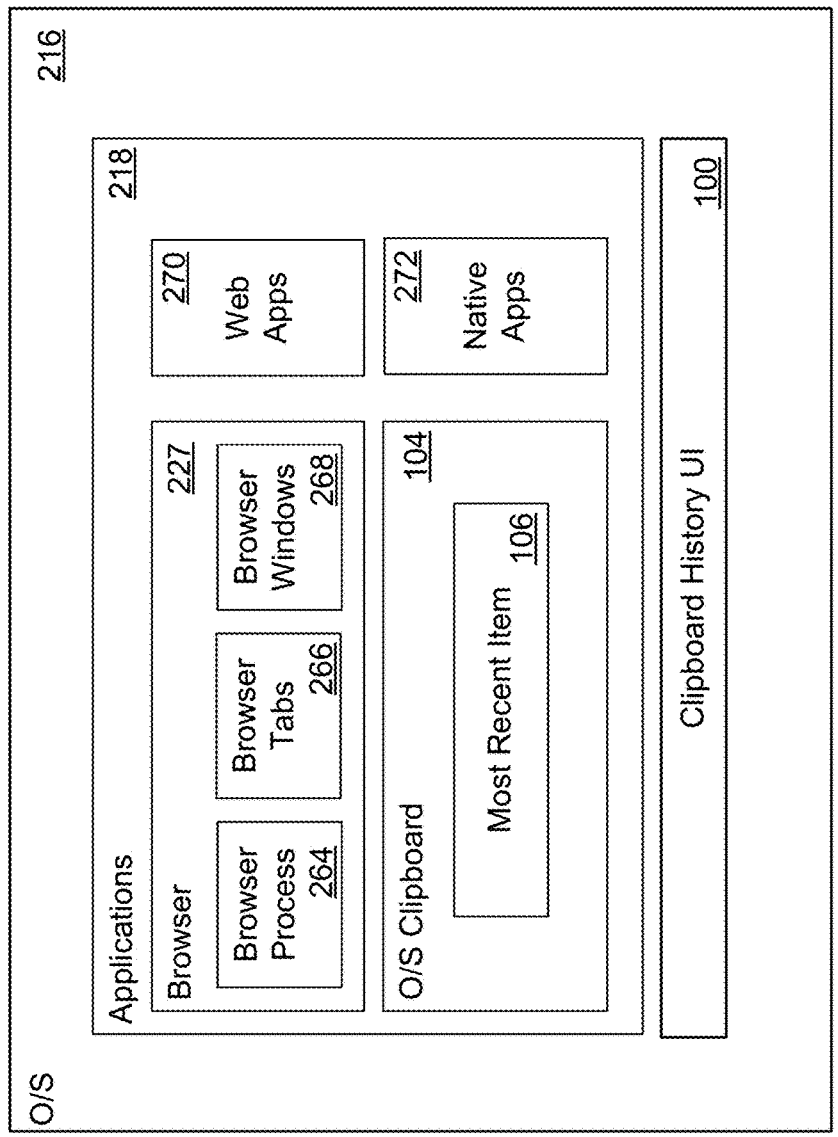

As shown in FIG. 2B, the O/S 216 includes the clipboard history UI 100 and additional applications 218. For example, the applications 218 may also include browser applications 227. A browser application 227 represents a web browser configured to access information on the Internet. The browser application 227 may launch one or more browser processes 264 to generate browser content or other browser-based operations. The browser application 227 may also launch browser tabs 266 in the context of one or more browser windows 268. The applications 218 may include web applications 270. A web application 270 represents an application program that is stored on a remote server (e.g., a web server) and is delivered over the network 240 through the browser tab 266, for example. In some implementations, the web application 270 is a progressive web application, which can be saved on the device and used offline. The applications 218 may also include non-web applications, which may be programs that are at least partially stored (e.g., stored locally) on the computing system 202. In some examples, non-web applications may be executable by (or running on top of) the O/S 216.

The applications 218 may further include native applications 272. A native application 272 represents a software program that is developed for use on a particular platform or device. In some examples, the native application 272 is a software program that is developed for multiple platforms or devices. In some examples, the native application 272 is a software program developed for use on a mobile platform and also configured to execute on a desktop or laptop computer.

The applications 218 may further include a clipboard application, such as O/S clipboard application 104. The clipboard application 104 may be configured to store the most recent item 106 based on a most recent capture, cut, or copy operation received during a user session 230.

The applications 218 can be configured to support copy/cut operations that allow users to copy data to a clipboard and/or store the clipboard data in memory. The clipboard data may pertain to the O/S clipboard 104. In addition, the applications 218 can be configured to copy data to a clipboard history UI 100 that enables several historically copied content items to be stored and retrieved. Although not shown in FIG. 2, the computing system 202 can be configured to store content items on a clipboard history UI that is accessible via a network or other remotely storage device.

In general, the applications 218 can be configured to support selection of text, HTML, images, objects, tables, or other selectable content item within the applications 218. The selected data can be used to generate data in fields, documents, prints, art, etc. In addition, the selected data may be used to generate search terms and/or addresses used to generate hyperlinked content, text content, or other formatted content.

Figure 2C:
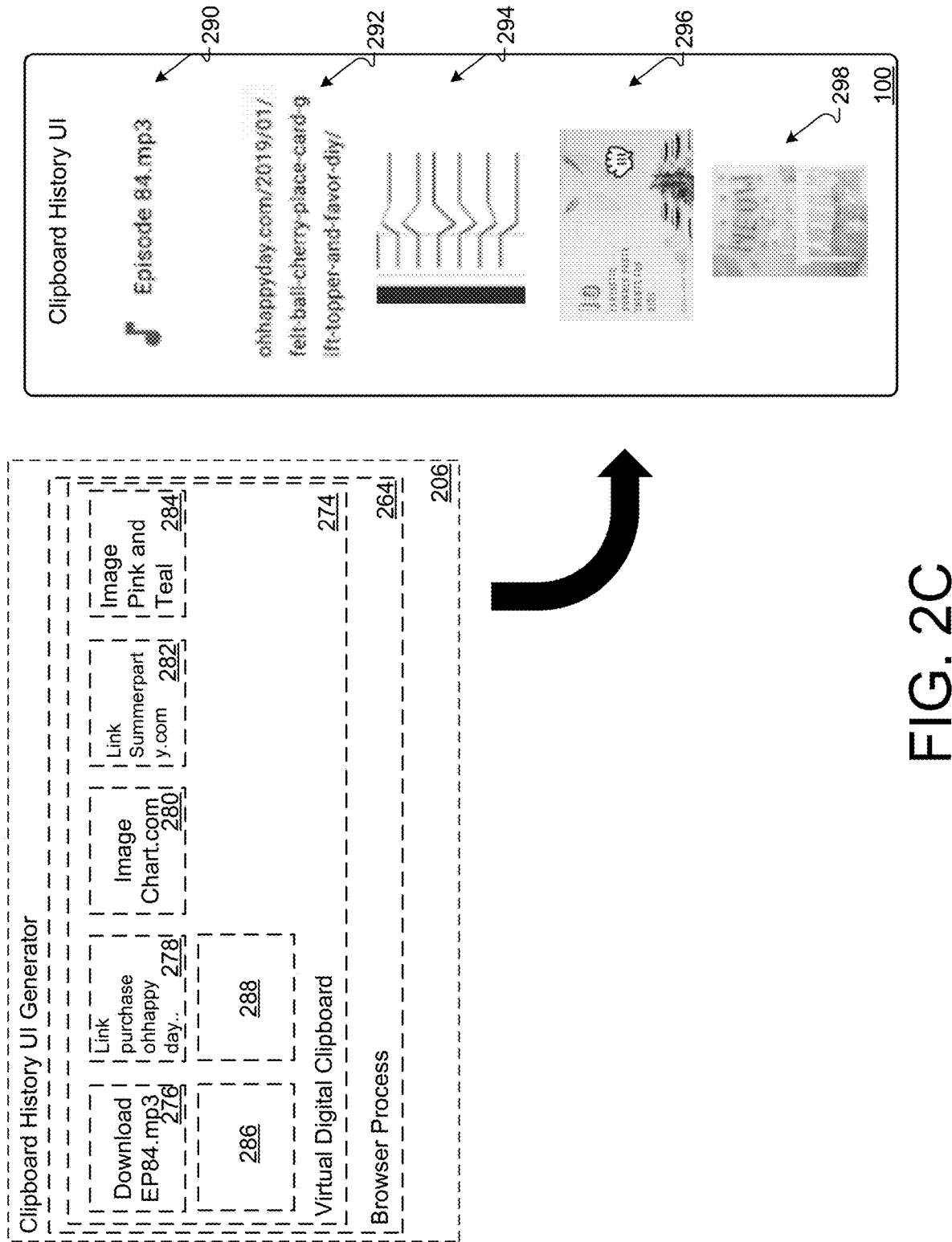

As shown in FIG. 2C, the clipboard history UI 100 may be populated by the clipboard history UI generator 206. The generator 206 may be implemented by the O/S 216 which can use a single browser process 264 to generate and maintain a virtual digital clipboard 274 configured to store, track, populate, and update the content items and each respective content item rendered in the clipboard history UI 100. In some implementations, the O/S 216 may instead utilize an application process (not shown) or another processing thread to generate and maintain a virtual digital clipboard 274 configured to store, track, populate, update, and otherwise represent the content items and each respective content item rendered in the clipboard history UI 100 The clipboard history UI generator 206 may leverage the O/S clipboard 104, for example, to retrieve copied or downloaded content items and represent such content on the virtual digital clipboard. In this way, the present approach can facilitate the integration of rendering of tagging language content and/or multi-copy and multi-paste operations with existing O/S functionality such as keyboard shortcuts.

In this example, a user has copied a content item 276 representing a downloaded mp3, a content item 278 representing a link, a content item 280 representing an image, a content item 282 representing a link content item 282, and a content item 284 representing an image.

The virtual digital clipboard 274 may store copies of copied, cut, or downloaded content. The O/S 216 may use clipboard history UI generator 206 to determine how to render such content items in clipboard history UI 100 to allow for user recognition and easy use of the content items 276-284. In addition, other content items 286, and 288, or additional content items may be stored upon receiving copied, cut, or downloaded additional content.

The generator 206 may, for each subsequent detected copy operation or cut operation or download operation associated with a respective content item, trigger a search of data associated with the respective content item in which the search is configured to determine whether the data includes at least one table tag or at least one image tag (in other words, the search is configured to determine a content type, where the content type can be determined based on one or more tags included in the data associated with the content item, or in any other suitable manner), generate a respective representation of the respective content item based on the search, and trigger rendering of the clipboard history UI 100 with the respective content item rendered according to the respective representation. Alternatively, the triggering of the rendering can occur after each subsequent detected operation. For example, if table tags or image tags are found in the search, then HTML-like content may be generated and rendered to represent a particular content item in UI 100. If no such tags are found in the search, then plain text, or exact copied text may be rendered the particular content item in the UI 100.

In FIG. 2C, the content item 276 is a downloaded mp3 file that may be searched for HTML (or other tagging language content) to determine a type and/or contents of the item 276. In this example, the generator 206 may have determined that the mp3 extension indicates an audio file and may generate the audio file content item 290 in the UI 100 for later selection. In this example, the generator 206 may have generated an image of a music note, as shown in content item 290.

Similarly, the generator 206 may assess and/or search content item 278 to determine that the item includes a URL link to a purchase on a specific website. The generator 206 may then determine that because a purchase can be made, the link itself may be a useful representation for the user to later select and enter into a browser to make a purchase for example. Thus, the generator 206 may generate a URL to represent the copied content item 278.

The generator 206 may also analyze content item 280 to determine that an image is represented. The image may be a standard image or may be a link represented by an image. In this example, the generator 206 may determine that the content item 280 may be well represented for a user by providing the actual snipped, clipped, copied, etc. image in the UI 100.

The generator 206 may analyze the content item 282 to determine that a link with images and related content is represented. The generator 206 may determine that the content item 282 may be well represented for a user by providing the image that includes the link and the title of the article instead of just a snip of the image itself, as shown by content item 296.

The generator 206 may analyze content item 284 to determine that an image is represented, but no other detail is shown or available with the image. The generator 206 may determine that the content item 284 is well represented to the user as a simple selectable image, as shown by content item 298.

In operation, the virtual digital clipboard 274 represents a renderer process that generates the clipboard 274, but does not render the clipboard 274 at any time. The virtual digital clipboard 274 functions as a queue running in a browser process 264 that may be used to populate clipboard history UI 100 at appropriate times. The virtual digital clipboard 274 provides an advantage of saving rendering time when rendering UI 100 content items because the clipboard 274 relies on a single browser process (e.g., a single thread) that is maintained and reused by the O/S 216 each time content items are to be presented in UI 100. By reusing a single browser process to generate the clipboard 274, overall runtime and system memory may be reduced as compared to starting a new browser process for each content item. The clipboard 274 may be maintained and generated in the background (i.e., not visible) while a user works within a user session of the O/S. For example, the clipboard 274 may track and map content captured at the O/S clipboard 104 in order to later generate and render the content as content items in UI 100. Each time the clipboard history UI 100 (i.e., configured to support multi-item operations) is triggered, the O/S 216 via the browser process 264 may trigger UI 100 to render a content item from clipboard 274. The content items rendered in UI 100 may be tracked using clipboard 274 to ensure that a standard paste operation (e.g., Control-v) or selection in the displayed/rendered UI 100 may trigger a paste of a particular item within UI 100. Conventional systems allow for copy and paste of the most recent content item 106 and do not provide for additional items to be pasted unless the user replaces the most recent content item 106 with a new content item. However, the most recent content item 106 is removed from the clipboard 104 and can no longer be selected or pasted. In addition, conventional systems may have to use multiple browser processes 264 to copy and paste multiple content items. For example, each time conventional systems are requested to render HTML content items, a new browser process 264 is triggered and additional memory and processing resources are used. System resources may therefore be used more efficiently with the approach described herein.

In operation, the virtual digital clipboard 274 may use the browser process 264 to generate placeholder images in the background, where the placeholder images are not shown or rendered. For example, the browser process 264 may be used over and over to generate a rendered copy surface that represents the virtual digital clipboard 274 (but is not displayed to the user). Each image on the virtual digital clipboard 274 may be analyzed and used to generate actual rendered content items for UI 100. System resources may therefore be used more efficiently. Moreover, by keeping the rendered copy surface in the background, the lag time in displaying or providing (rendering) the UI 100 in response to a trigger (such as a user input) may also be reduced. In the event that the content is not HTML (or other tagging/markup language) content, then the virtual digital clipboard 274 may not be used, as standard unformatted text may be instead generated for rendering in the UI 100 without the further analysis utilized by clipboard 274.

In some implementations, the clipboard 274 may be stored in order to fill (e.g., populate) UI 100 upon receiving a user paste operation. In some implementations, if a user selects a first item from clipboard history UI 100, then the O/S 216 can send a paste operation to paste the first item into the application or document in focus of the cursor, which populates, using the first item from the UI 100, at or near the cursor. If instead, the user selects a second item from the UI 100, then the system 200 may hot swap the second item and the first item in the virtual digital clipboard 274 in order to allow a standard paste operation to function with the second item in UI 100. Similarly, additional content items in the list may be hot swapped via clipboard 274 with the first item to allow for the same shortcut paste operations to function with any content item in the UI 100.

The virtual digital clipboard 274 may operate with a timeout setting in which the single browser process 264 is maintained as active until the timeout setting is reached. Example timeout session may be five to ten minutes, or other user-configurable time table.

In operation, the system 200 may generate a clipboard history UI 100. In response to detecting a copy operation or a cut operation associated with a content item, the system 200 may trigger a search of data associated with the content item. The search may be configured to determine a content type. The system 200 may additionally generate a representation of the content item based on the search trigger rendering of the clipboard history UI 100 with the content item rendered in the clipboard history UI according to the representation. The system may render the content item with other content items rendered in the clipboard history UI. The content item and the other content items are sequentially populated in the clipboard history UI according to a corresponding copy operation or cut operation.

FIG. 3 is a screenshot 300 illustrating a UI indicator 302 to use the clipboard history UI, in accordance with implementations described herein. In this example, a user may be entering information into a travel website. The O/S 216 may generate the UI indicator 302 (e.g., a nudge, a tip, a help pop-up, etc.) to notify the user of the availability of the clipboard history UI for multiple copied content items in response to detecting the user has copy or cut content items during the same user session, for example. The copied or cut content items may be captured for a clipboard history, such as a clipboard history UI 304.

The UI indicator 302 may include an indication that the user may view and select/paste any of multiple copied content items can be launched for use from a clipboard history UI 304, for example. In some implementations, the UI indicator 302 may be provided based on a time period to ensure that the user is not interrupted often with the same information. For example, the UI indicator 302 may be provided if the user performs copy or cut or paste operations more than once within a predetermined time period. For example, the system 200 may provide the UI indicator 302 if two to five operations are received within a three to ten minute time period, for example. In some implementations, such indicators may be triggered a maximum number of times within a twenty four hour time period.

In some implementations, UI indicator 302 may be triggered when a pattern of operations are received. For example, the O/S 216 may detect a single copy and may present the indicator 302. In another example, the O/S 216 may be configured to detect a copy operation (or cut operation) and a paste operation before presenting the indicator 302. Other patterns are possible and configurable with the O/S 216.

Once the UI indicator 302 is presented, a user may select the indicator 302 to launch the clipboard history UI 304. In some implementations, the clipboard history UI 304 may be launched automatically in response to the O/S 116 detecting the configured operation (e.g., command) pattern. In this example, the user selected UI indicator 302 to launch clipboard history UI 304. As shown here, UI 304 includes a user's ID, account information, and a friend's itinerary times document representing a recently downloaded document. Such information in UI 304 may have been recently copied, pasted, downloaded, or otherwise stored from previous interactions the user has performed with the computing system depicting the website shown in screenshot 300, for example.

In an alternative implementation to a full clipboard history UI 100, the system 200 may generate and provide portions of the UI 100 to provide suggestions and access to selecting the suggestion without triggering display or provision (rendering) of the UI 100. Such a portion of the UI 100 can be configured to function similar to autofill, but the information is retrieved from a clipboard history rather than previous data entered in a webpage or document. For example, instead of providing full UI 304, the system 200 may provide a partial clipboard history UI 306 which suggests a user ID from a stored version of full UI 304, for example.

FIG. 4 is a screenshot 400 illustrating copying of multiple content items to the clipboard history UI while remaining within an application, in accordance with implementations described herein. In this example, a user may be planning a trip with a group of other users. The users may generate a shared itinerary document in an online document. One or more users may perform multi-copy operations to generate content for the clipboard history UI (e.g., such as clipboard history UI 100, but with different content items) while remaining in the travel documents and simply selecting to clip (e.g., copy, cut) several content items. Such content items may populate the clipboard history UI. In some implementations, the clipboard history UI 110 may not be displayed while copy operations occur. In some implementations, the clipboard history UI 100 may be depicted as docked, floating, attached to a cursor, attached to a document, available from a menu, or other non-intrusive manner in order to allow the user to view content items while clipping without shifting focus off of the application in which the user is clipping content items.

Upon clipping content to the clipboard history UI 100, the users may wish to transfer the itinerary to individual events in a calendar application. The clipboard history UI 100 may be used to do so. For example, the system 200 may generate a clipboard history UI 100 as a user copies, cuts, pastes, etc. content items. The user may use the clipboard history UI 100 to copy and paste multiple contents from a first application (e.g., an app, online document, webpage, etc.) to a second application (e.g. a calendar application). For example, the O/S 216 may enable the user to copy multiple content items successively to be transferred from the first application to the second application by clicking on an input field of the second application to open the clipboard history UI 100 (e.g., using the keyboard shortcut, context menu, or UI indicator) and pasting the copied content items from the clipboard history UI into the second application. Thus, the user minimizes the number of copy/paste operations unlike conventional systems that instead force a user to copy content items from each cell of a sheet or document one at a time and to paste each content item in the input of the calendar in separate operations. The clipboard history UI 100 may be configured to enable the user to stay within the context of the user's application (e.g., the itinerary document), and copy all content items for later population in the second application (e.g., the calendar application).

As shown in FIG. 4, the user selects several content items (e.g., content item 402, content item 404, content item 406, content item 408, and content item 410) which generates the clipboard history UI 100 for rendering the content items 402-410 while in the travel website and without changing cursor focus to the clipboard history UI 100. Here, the user may perform copy operations 412 (e.g., selections, clicks, keyboard shortcuts) to begin populating the clipboard history UI 100. After selecting the content items 402-410 and/or any other content items, the user may wish to use the content items in another application, as described in FIG. 5.

Figure 5:
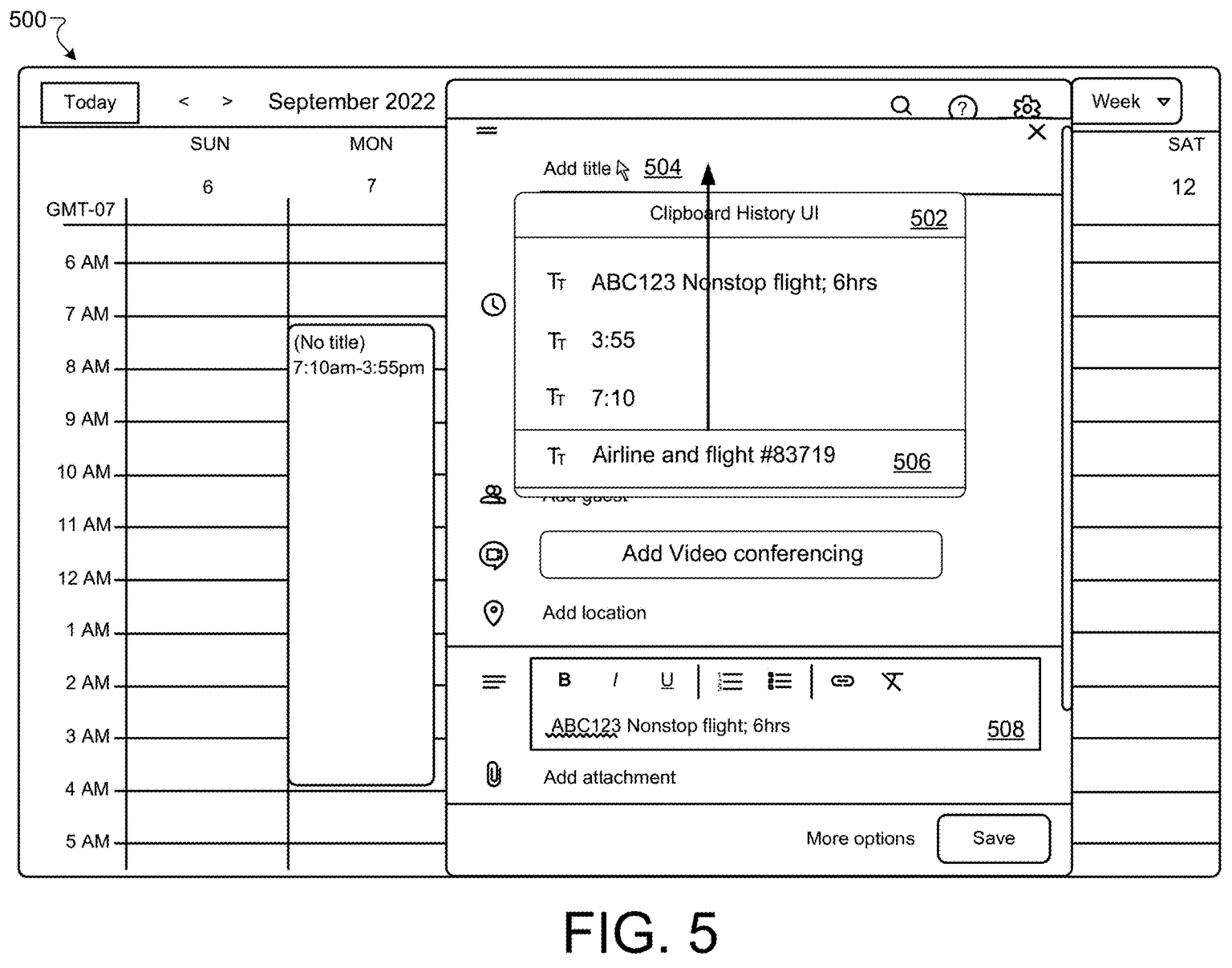

FIG. 5 is an example screenshot 500 illustrating provision and use of the clipboard history UI within an application, in accordance with implementations described herein. In this example, the user may have generated a clipboard history UI 502 that includes any number of items that the user copied from the first application. Here, the user may begin to add content to the calendar (i.e., the second) application. For example, the user may click an input field 504, as shown by the cursor in order to trigger rendering of the clipboard history UI 502 at the input field 504. The UI 502 presents options for the user to select previously copied or downloaded content item (or related data) into the input field 504. The user in this example selects the airline and flight number text content item 506 to paste the text content item into the input field 504. In this example, the content items are generated as a text content type. At some time before the title of the calendar item was pasted, the user may have selected another content item from UI 502 in a notes section 508.

In general, the O/S 216 may place the clipboard history UI 502 at a particular position within an active input field (e.g., above, below, right, or left) or near the appropriate option in a context menu (not shown). In some implementations, the clipboard history UI 502 is placed in a context menu. Regardless of placement (or rendering state) of the UI 502, the user may continue to copy content into the UI 502.

Figure 6:
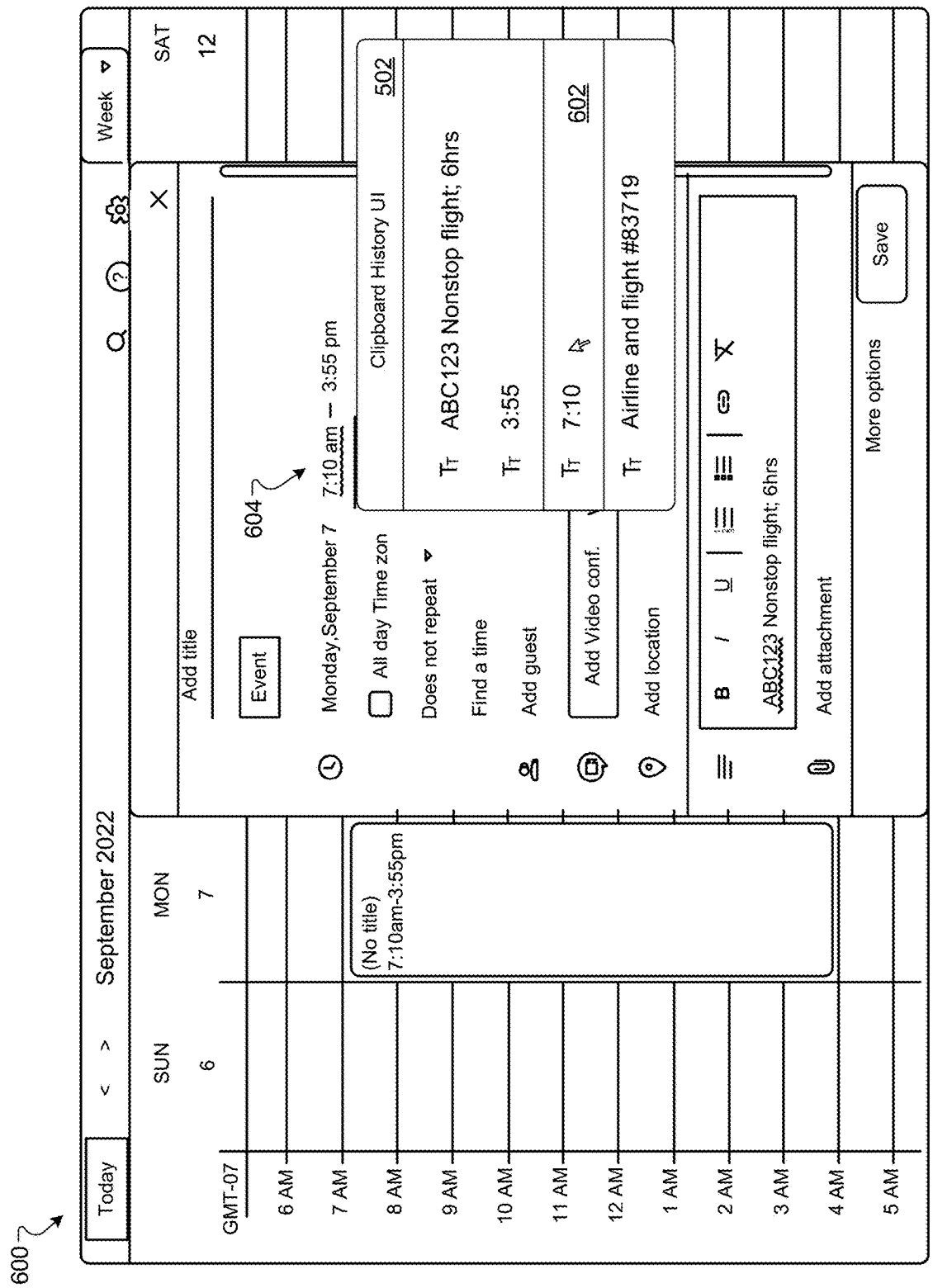
FIG. 6 is another example screenshot illustrating provision and use of the clipboard history UI within an application, in accordance with implementations described herein.

FIG. 6 is another example screenshot 600 illustrating provision and use of the clipboard history UI 502 within an application, in accordance with implementations described herein. The UI 502 is previously generated by the user having selected a number of items to place in the clipboard. The user may be continuing to paste content from the UI 502 into the calendar application of screenshot 600.

For example, the user may select a time 602 from the UI 502. The time 602 may represent previously copied from a flight in a previously accessed application (e.g., FIG. 4). Upon selecting time 602, the input field 604 is set to the selected time. Similar selections and pastes may be performed throughout the calendar application using the clipboard history UI 502.

In general, the clipboard history UI 502 may be provided as a drop down menu or other floating or temporary menu that may be removed from view and/or not the focus of the input cursor so that the user may fill in the input of the calendar application without having to refocus the cursor between windows. If the content items shown in UI 502 are depicted as separate floating items, each item may be selectable upon focusing on a particular input field in order to paste the selected content item at the input field without taking the cursor focus off of the application with the input fields.

Figure 7:
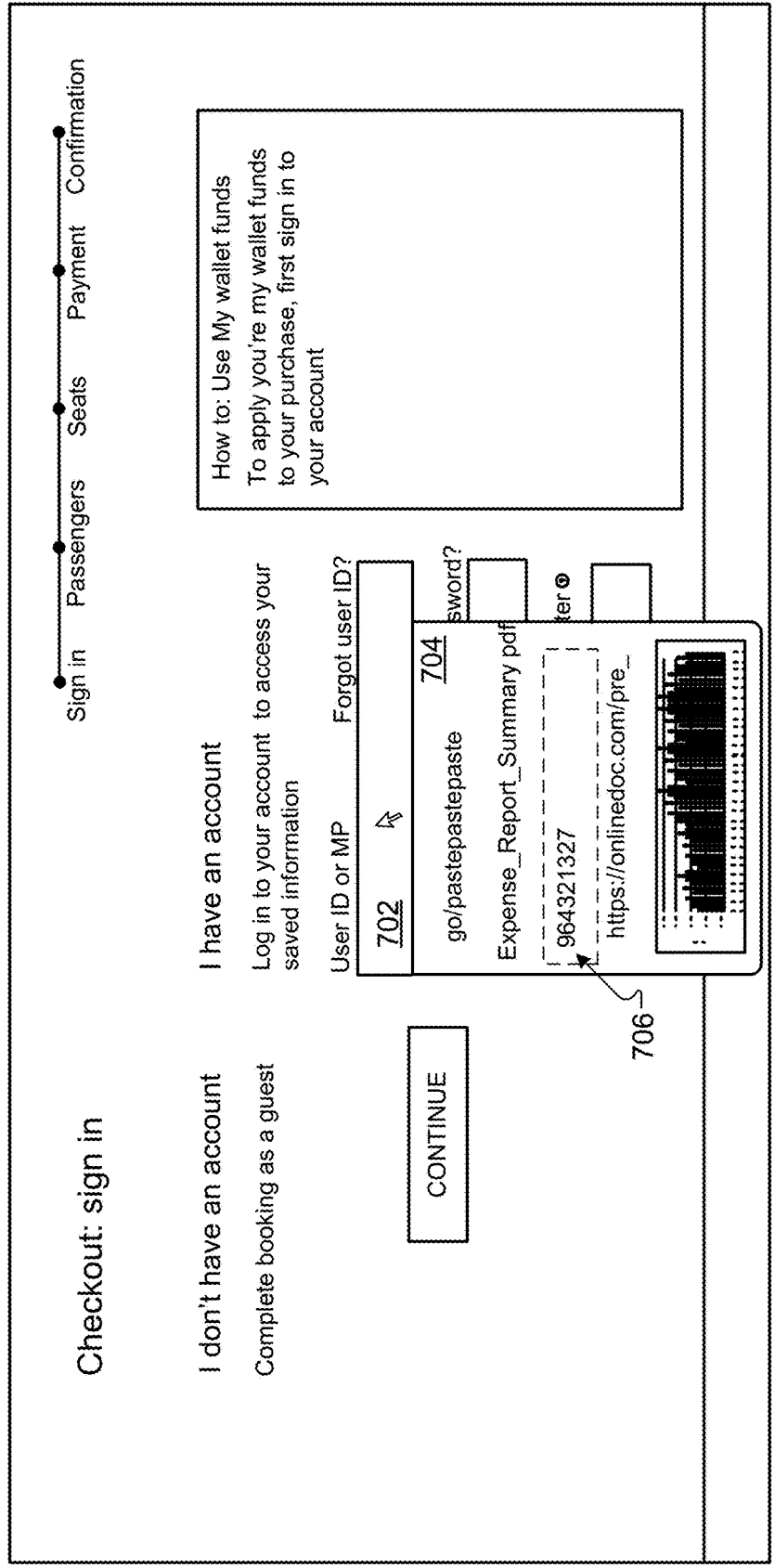
FIG. 7 is an example screenshot illustrating provision and use of the clipboard associated with an active input field, in accordance with implementations described herein.

FIG. 7 is an example screenshot 700 illustrating provision and use of the clipboard with an active input field, in accordance with implementations described herein. In this example, a user may be entering information into a travel website. In response to the user placing a cursor at an input field, such as input field 702, the O/S 216 may generate and render a clipboard history UI 704 to notify the user of the availability of the clipboard history UI for multiple copied content items.

In this example, the O/S 216 may detect a cursor at an input field, such as input field 702. The O/S 216 may then determine that the input field corresponds to at least one content item in the clipboard history user interface 704. For example, the O/S 216 may determine the user had previously copied a user ID 706 and may trigger the rendering of the clipboard history UI 704 as a UI element (e.g., a menu, a context menu, a list, an action item, a control, etc.) adjacent to the input field 702 and with the at least one content item (e.g., user ID 706) marked for suggestion as input into the input field 702. For example, the clipboard suggestion engine 220 may assess the UI 704 and the application in screenshot 700 to generate a suggestion. If the user selects the suggested content item 706, the system 200 may populate the input field 702 with the selected item 706. If the user selects a different content item in the UI 704, the system 200 may populate the input field 702 with the selected different content item. If the user does not wish to use any content item from UI 704, the UI 704 may fade away without causing cursor focus or re-focus actions. This example shows content items generated using a text content type, such as content item 706, as well as content items generated using a tagging language content type.

Figure 8:
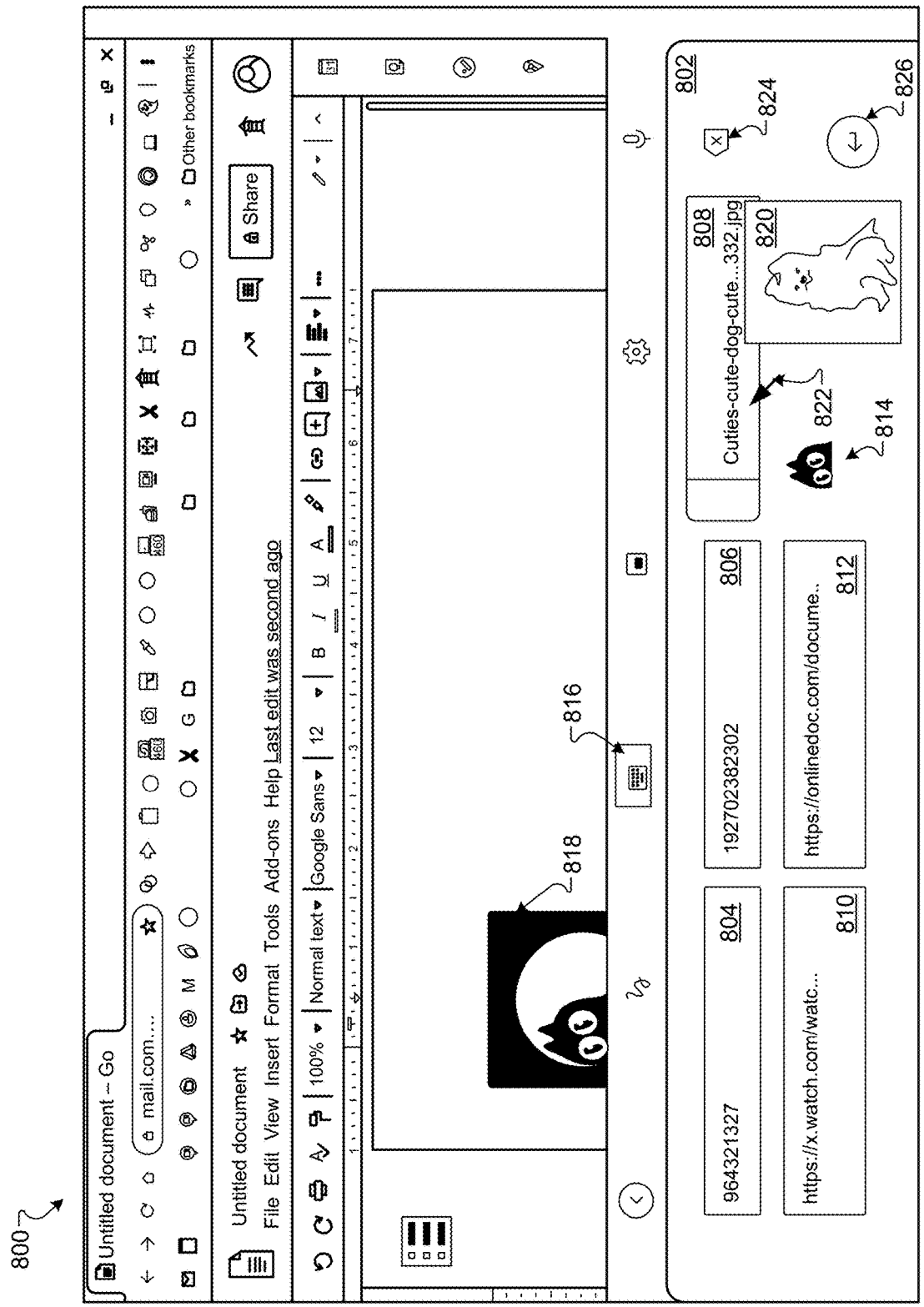
FIG. 8 is another example screenshot illustrating provision and use of the clipboard history UI within a virtual keyboard in accordance with implementations described herein.

FIG. 8 is another example screenshot 800 illustrating provision and use of the clipboard history UI within a virtual keyboard in accordance with implementations described herein. In this example, the user may access a clipboard UI 802 on a mobile device in which a virtual or soft keyboard is in use. The user may decide to copy content item 804, content item 806, content item 808, content item 810, content item 812, and content item 814 in the current application from any number of previously accessed applications. The UI 802 can be triggered for displaying/viewing from a virtual keyboard by selecting an icon 816, for example. Selecting icon 816 via the virtual keyboard or via a shortcut may trigger the clipboard history UI 802 to appear. The user can then begin to select and paste content from the UI 802.

As shown in FIG. 8, the user accessed UI 802 and selected content item 814 to paste the item in the document shown in screenshot 800, as indicated by image 818. Before the user selected the content item 814, the system 200 (i.e., the generator 206) may have received a copy or cut operation from a previous application with respect to content item 814. In response to detecting the copy or cut operation, the content type of the content item 814 can be determined, and a representation generated based on the determined content type. Here, the content type can be a tagging language content type, indicating that the representation image 818 of content item 814 should be visually rendered in the clipboard UI 820 as tagging language (such as HTML) content. The generator 206 may have determined to generate zoomed version of the image associated with the content item 814 to save resources and/or to make the image recognizable to a user looking to perform paste operations from the clipboard history UI at a later time. The image of content item 814 is a portion of pasted image 818 shown in the document. The generator 206 may zoom and remove pixels or otherwise clip the image to generate recognizable content for the user without cluttering the UI 802. The content item 814 is a scaled version of the original image, which is shown pasted as image 818. In general, selecting, tapping, or dragging with respect to a particular content item 804-814 may result in copying the particular content item into a focused document, such as the document depicted in screenshot 800. In addition, the user may perform a keyboard shortcut selection or a sweeping multi-select on two or more content items 804-814 which will result in pasting the selected items into the document. In some implementations, tapping on a content item may trigger pasting the content item into the document.

In another example, the generator 206 may perform a zoom operation on a large spreadsheet or table (e.g., or online document of the same type) to ensure that a portion of the spreadsheet is legible when presented as a content item in UI 802. In another example, if a bitmap image is copied from a browser application, the bitmap may be downloaded as a file, but if instead the image is copied from an online document, the image is copied as HTML representing a link to the image element. Thus, the generator 206 may perform a search to find table tags or image tags associated with the copied content item (e.g., the bitmap image) and may determine to display the content item according to the results of the search, as described throughout this document. In any of the examples described herein, determining whether to zoom or clip a portion of the content item to generate a scaled version of the content item can be based on one or more properties of the content item. For example, a size of the content item, a tagging language content type, the tagging language information, or any other suitable properties.

In some implementations, the systems described herein may provide a preview of the content item. For example, if a user performs a hover operation (or other user action), a preview of a particular content item may be rendered. In particular, the system 200 may generate and provide a preview of one or more content items. For example, the generator 206 may generate a preview 820 of the rendered content item 808 within the UI 802. Generating the preview may include generating a rendering of the content item that simulates a paste operation. As shown in FIG. 8, preview 820 depicts an image of the image associated with the copy operation (i.e., the file name shown in content item 808) in response to receiving an input operation 822 (e.g., hover input, selection, select command, shortcut command etc.).

In some implementations, the UI 802 may enable the user to use the keyboard to delete content items via a selectable control 824. In some implementations, the UI 802 may enable the user to use the keyboard to select content items to paste into an input field, application, or document via a selectable control 826. Other commands are possible. For example, a long press on a content item may select and offer a delete or other content item interactive option.

Figure 9:
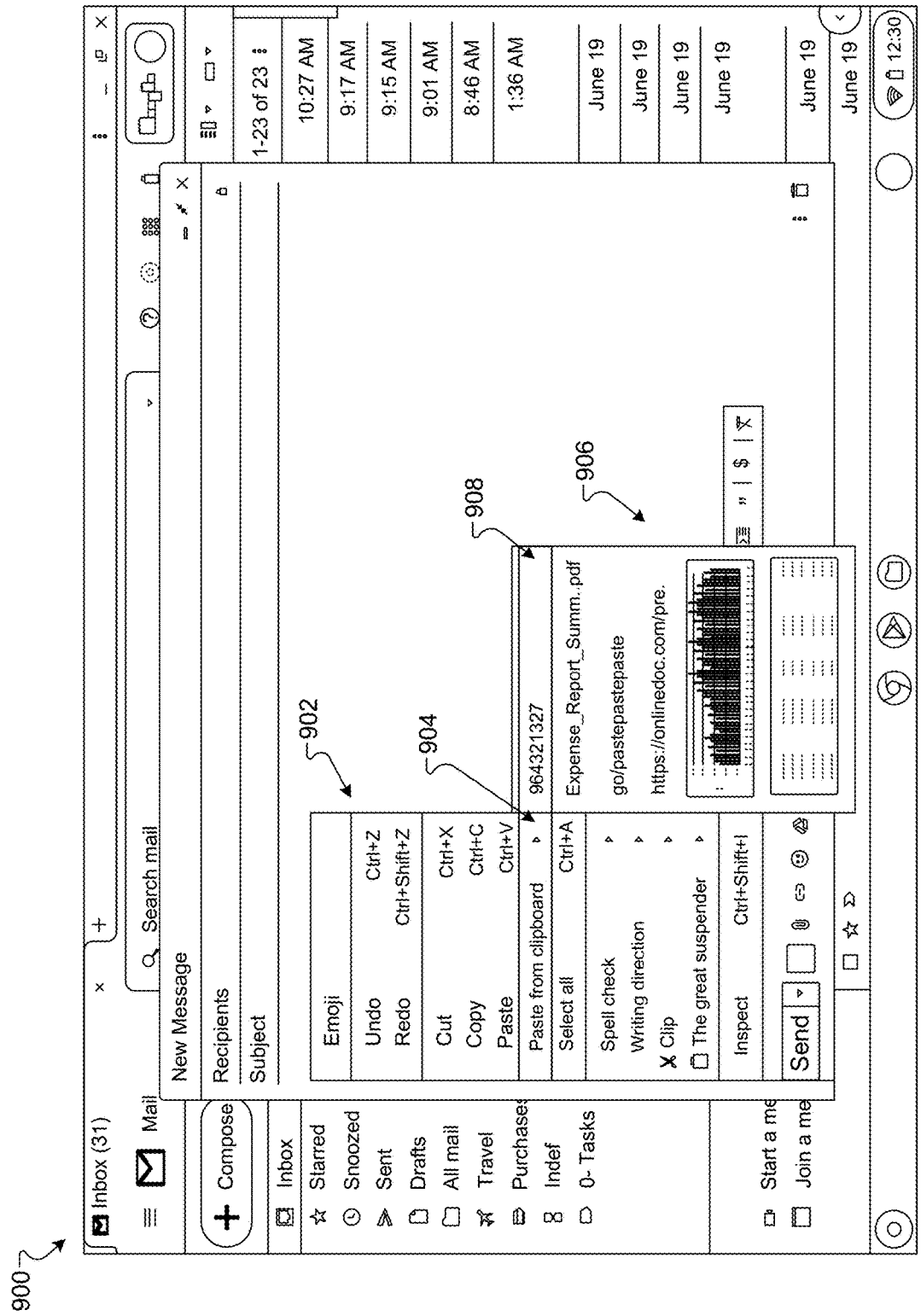
FIG. 9 is a screenshot illustrating example clipboard content presented within a context menu, in accordance with implementations described herein.

FIG. 9 is a screenshot 900 illustrating example clipboard content presented within a context menu, in accordance with implementations described herein. In general, the O/S 216 may place the clipboard history UI 906 at a particular position within an active input field (e.g., above, below, right, or left) or near the appropriate option in a context menu, as shown by context menu 902, paste from clipboard option 904, and clipboard history UI 906. In some implementations, the clipboard history UI 906 is placed in a context menu that may be configured to close when the user selects a desired content item (e.g., content item 908) from the clipboard history UI 906. Regardless of placement (or rendering state) of the UI 906, the user may continue to copy content into the UI 906. For applications that do not provide input bounds (e.g., online documents), the O/S 216 may place the clipboard history UI 906 at a position of the mouse cursor (not shown), as shown in FIG. 10.

In some implementations, a cursor input location may be indeterminable. In such examples, the system 200 may generate the clipboard history UI 906 at the mouse cursor location. Conventional systems typically default to a specific position of placing a clipboard in a menu bar or at the last known and/or used position.

Figure 10:
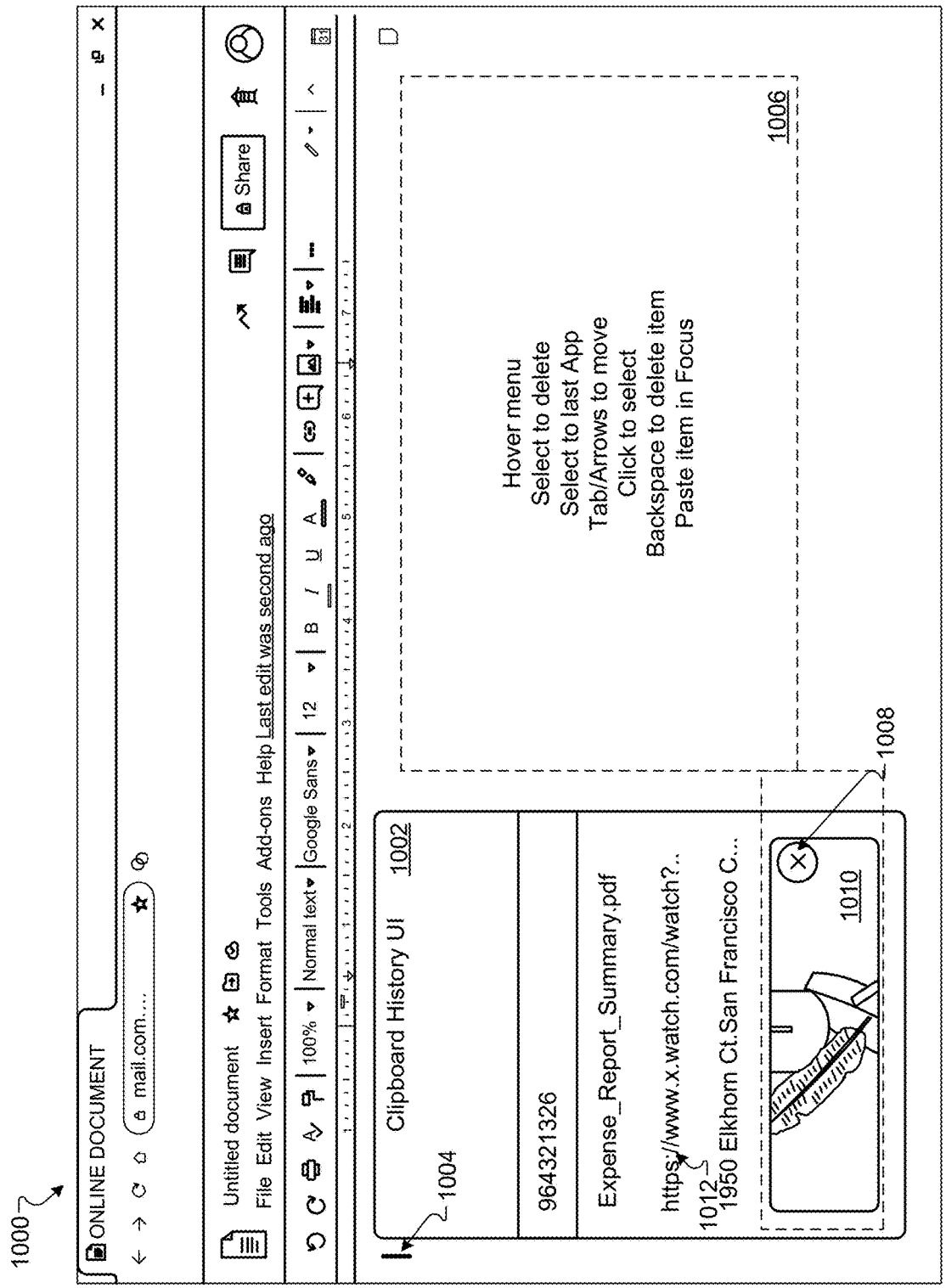
FIG. 10 is a screenshot illustrating an example clipboard history UI with additional menu options, in accordance with implementations described herein.

FIG. 10 is a screenshot 1000 illustrating an example clipboard history UI with additional menu options, in accordance with implementations described herein. In this example, an online document is shown in screenshot 1000 and a clipboard history UI 1002 is presented at the cursor 1004.

In some implementations, while clipboard history UI 1002 is open (as shown in FIG. 10), a user may select or perform a keyboard shortcut to paste a currently focused content item from the UI 1002 to the document, for example, before autofocusing the cursor 1004 on a next content item in a list of content items to await sequential pasting operations.

In some implementations, the UI 1002 may generate and display a hover menu that represents a menu 1006 for each particular UI 1002 or specific content item with options that are triggered based on a user entered hover operation (e.g., command). In some implementations, the system 200 may be configured to allow a user to hold down the shift key and press (or click) the enter key for pasting content items as plain text regardless of the formatting (or lack thereof) of the content item.

In some implementations, the system 200 may be configured to allow a user to focus on a specific content item using a first predefined key command, navigate between the contents using the navigation keys (up/down and left/right arrows), select content items using a second predefined key command or click to select command, and paste the selected (e.g., focused) content item in an active input field, document, application, etc. using a third predefined key command or click to select command. In some implementations, such predefined key commands may be configured to function in a multi-item operation in which a multi-select mode using, for example, another key command in combination with the one or more other key commands. Other multi-item operations may be configured including, but not limited to a multi-item copy operation, a multi-item paste operation, and a multi-item rendering operation. In some implementations, each of the multi-item operations may be configured to be triggered by a single input detected at a clipboard history UI.

In some implementations, the system 200 may be configured to generate a delete option (e.g., delete control 1008) which may be rendered on a respective content item when a user hovers over the respective content item. The user may select control 1008 to delete content item 1010.

In some implementations, the system 200 may be configured to enable a user to drag a clipboard history UI 1002 within a display screen. In some implementations, the UI 1002 may persist until the user closes it to allow for multi-paste & sequential paste operations. In some implementations, the system 200 may be configured to enable a user to hover on a content item (e.g., content item 1012) representing copied web content to trigger launch of a source website associated with the web content represented as content item 1012.

In some implementations, the system 200 may be configured to enable a user to drag content items from the clipboard history UI 1002 into an input field, document, and/or application. In some implementations, the system 200 may be configured to enable a user to paste plain text from the clipboard history UI 1002 by selecting a shift key and enter key command or click to select command. Upon pressing shift, a visual representation (e.g., a preview) of the content item may be displayed to mimic what a plain text representation of the content item would look like upon being pasted into an input field, document, application, etc.

Figure 11A:
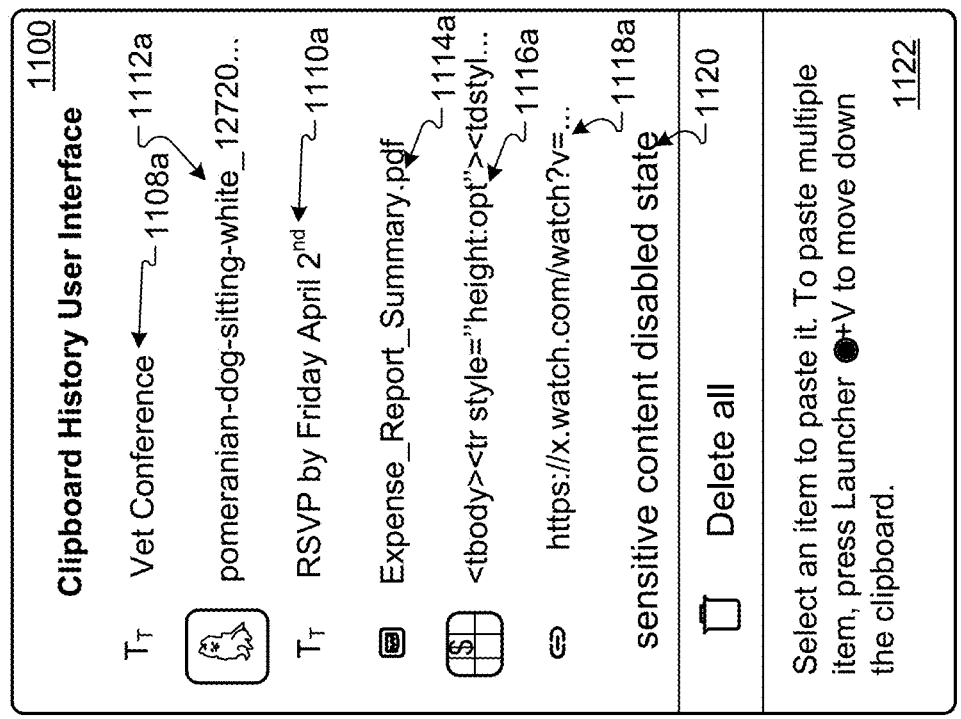
FIGS. 11A-11B are screenshots illustrating example clipboard history UIs, in accordance with implementations described herein.

FIG. 11A is a screenshot illustrating an example clipboard history UI 1100, in accordance with implementations described herein. The example UI 1100 represents UI 100 and may include various types of content. The content may include content items that are successively and sequentially copied or downloaded by a user. In some implementations, the content items are displayed in sequential order of last item copied to initial item copied. In some implementations, the content items are displayed in a particular order of precedence based on the content type. For example, the UI 1100 may display certain file types before other file types in the list of content items. For example, bitmap images may be depicted first (these may have a bitmap content type, or be considered to have a text content type for the purposes of this description) while tagging/markup language (e.g., HTML) images may be displayed second. In some implementations, a placeholder image may instead be depicted in the UI 1100 in the event an image cannot be loaded or obtained. Text content items may be displayed before HTML (or other tagging or markup language) content items while rich text format (RTF) content items may be displayed after HTML content items. In some implementations, links, bookmark titles, and/or files application content items may be displayed last in the UI.

In some implementations, the system 200 may autofocus a cursor on a first content item in the clipboard history UI 1100 when rendering the UI 1100. In some implementations, the UI 1100 may render additional data including metadata, source data, timestamp data or other information to provide context to a user viewing content items in the UI 1100.

In operation, the system 200 may allow a user to enter launch shortcuts or selection to open the clipboard history UI 1100. While the clipboard is open and when the user enters a paste command, the system 200 may paste a currently focused content item from the clipboard. The system 200 may then autofocus (i.e., place) the cursor on the next content item in the list of content items to facilitate sequential pasting of content. In such an example, the user may initially perform a paste command to paste the first item while other content items can be pasted by selecting a single key to sequentially paste each item in the list in the UI 1100. Other keys can be used to enable selection of formatting or no formatting when pasting of content items. In some implementations, a detected paste command may be a first paste command that the user has performed within a session. The first paste command may trigger the full UI 1100 to be rendered for the user.

Within the clipboard history UI 1100, the system 200 via the operating system 216 can allow a user to focus on a specific content using a first specific key (e.g., a tab key or other configurable key). Similarly, the system 200 may also allow navigating between the content items using the navigation keys (e.g., up/down and left/right arrow keys), selecting the content items using a second specific key (e.g., a backspace key or other configurable key or click), and pasting a selected/focused content item in an active input field using a third configured key (e.g., an enter key or click).

As shown in FIG. 11A, the UI 1100 depicts previously copied items including text content item 1108a and text content item 1110a, image content item 1112a, file content item 1114a, online content item 1116a (e.g., online stored documents), link content item 1118a, and private content 1120. The text content item 1108a and text content item 1110a both include a unique text snippet that the user may have copied from another source (e.g., a document, a website, etc.). The text content item have a text content type, and may be rendered in plain text to make more efficient use of computational resources. Image content item 1112a includes an image captured or copied by the user at a previous time from another source outside of the UI 1100.

The image content 1112a is generated using a tagging language content type and includes a rendering of at least part of the original captured/copied image as tagging language content. File content item 1114a includes a portable data file indicating a portion of an expense report captured or copied at a previous time from another source outside of the UI 1100. Online content item 1116a includes an html link captured or copied by the user at a previous time from another source outside of the UI 1100, and includes a rendering of at least part of the content as tagging language content. Private content 1120 may be visible but not pasteable. In addition to content items the clipboard history UI 1100 may include a tips or help portion 1122 to assist the user in interactions with the UI 1100. In this way, a user may be able to better distinguish between different content items, as well as providing visual confirmation of the particular content which has been copied by the user. With display of the rendered clipboard history user interface described herein, one or more technical limitations associated with small display screens may therefore be overcome, since a user need not zoom in or otherwise increase the size of the displayed/rendered content to make appropriate selections of content items.

Figure 11B:
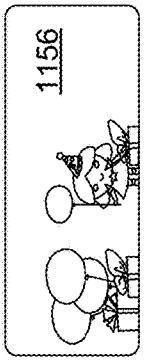

FIG. 11B is a screenshot illustrating another example clipboard history UI 1150, in accordance with implementations described herein. The UI 1150 represents a floating interface that allows for a user to access clipboard history content generated from anything a user may have copied, captured, or cut from a screen (e.g., text, images, screenshots, URLs, files, etc.). The floating interface of UI 1150 may provide an advantage of easy access without having a solid window UI obscuring particular areas of content. User's move between many resources (apps, documents, folders, etc.) to complete a task by combining content and refining the content to accomplish a goal (e.g., a final document), A common model is to have a working resource as a place to build (i.e. write, paste, draw, etc.), and a number of open support resources that the user may be referencing. It can be difficult using conventional systems to rearrange all resources in an optimal way especially on a small screen. The system 200 may enable the floating clipboard history UI 1150 for a user to float content (e.g., images, text, links, files, screenshots, etc.) on top of the working resource such that regardless of where the user clicks within the screen(s), the UI 1150 remains on a top level of the screen of UIs. The user may move these floating artifacts anywhere on the screen. Users may also resize the floating artifacts.

As shown in FIG. 11B, the clipboard history UI 1150 includes content items 1152, 1154, 1156, and 1158 that the user captured (e.g., screenshot, cut, paste, drag, selected) from another resource outside of document 1160. In this example, the user may be planning a birthday party and may be accessing an online document 1160 or app to generate a timeline document. Elements that may be used while curating party content and items may be helpful to the user as the user enters information in the document. Keeping the floating UI 1150 of content items at hand can function to allow the user to have a reference to the content items for the task of party planning. For example, a content item may include a snippet that the user may wish to reference when drafting an invite. Another content item may include party colors for reference to other purchases made for the party. In such an example, the user may drag any of the content items 1152-1158 to or away from another reference document or resource accessed in the screen.

The content item 1152 represents a URL to a product that the user may wish to purchase. The URL in content item 1152 may be hovered upon to view a preview of an image of elements that the user may have purchased, for example. In some implementations, an image may be presented at content item 1152 instead of the URL in response to the system 200 determining that the image may provide a context for the user.

The content item 1154 represents a string text snippet that the user obtained from the document 1160 to remind the user to perform a task, for example, during work in other projects (where UI 1150 can be displayed). The content item 1156 represents an image the user may have downloaded for printing on an invite. The content item 1158 may represent a part of a music playlist that the user may want to create for the party.

Floating the content items 1152-1158 may alleviate switching back and forth between the working document (e.g., working resource) and websites, support documents, and support resources. In some implementations, content items 1152-1158 may be moved around the screen and working resource because the items, while part of UI 1150 are presented in an invisible UI that overlays all screen content. Although UI 1150 overlays text on the document 1160, the user or the system 200 may avoid the obscuring of text and/or images by generating content items of UI 1150 in portions of the screen that do not include text and/or images. Similarly, content items may be zoomed, shrunken, enlarged, minimized, maximized, and/or clicked upon to view live content or to be transported to stored folders and/or files pertaining to a selected content item. In some implementations, a user may use a single command to minimize (or miniaturize) an entire clipboard history UI 1150 to a location in the document or to a taskbar. In some implementations, the floating UI 1150 may be made part of a context menu, a shortcut menu, or input field, similar to UI 1100.

Figure 12:
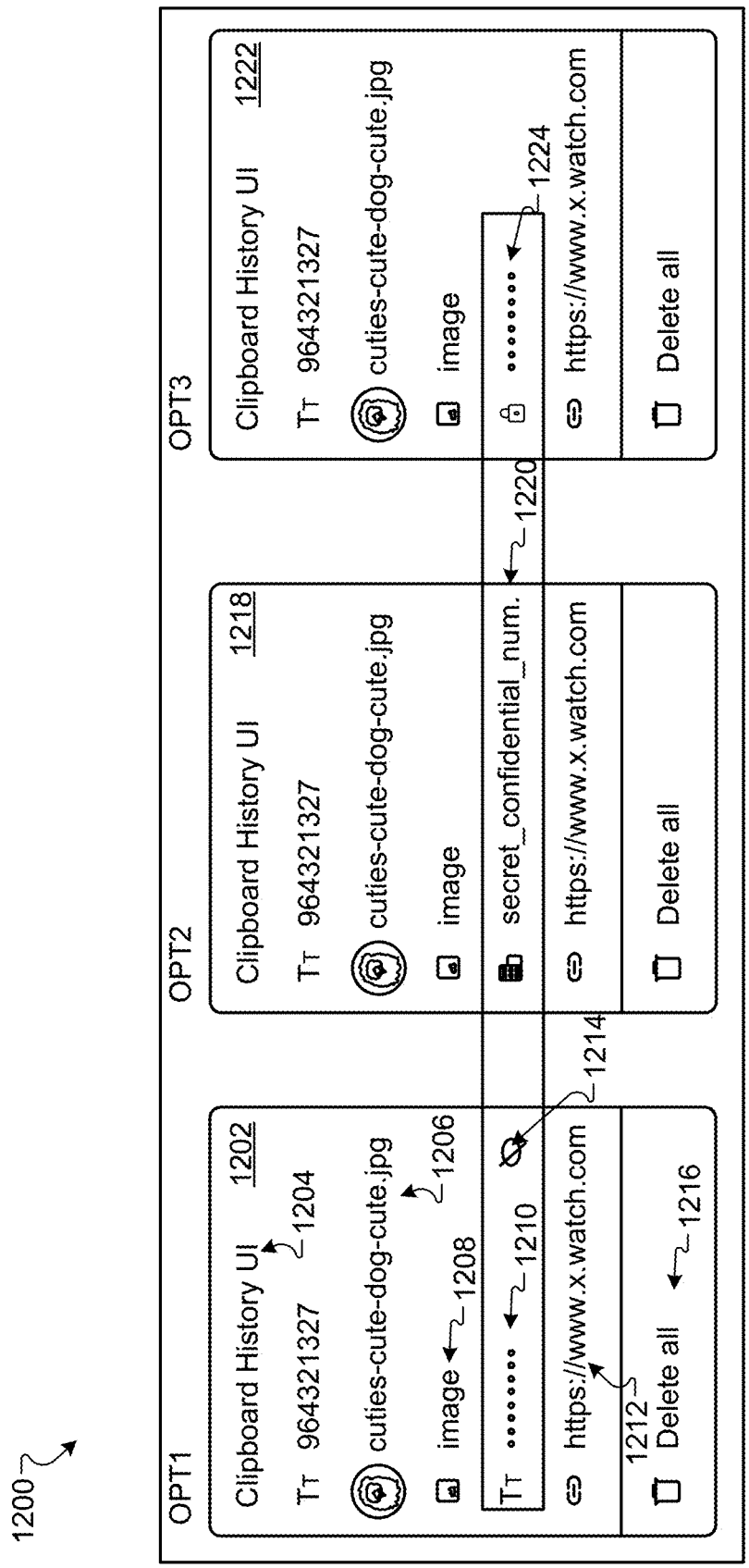
FIG. 12 is a screenshot illustrating an example of hiding copied contents in the clipboard history UI, in accordance with implementations described herein.

FIG. 12 is a screenshot 1200 illustrating an example of hiding copied contents in a clipboard history UI, in accordance with implementations described herein. The system 200 may access clipboard history UI generator 206 to utilize permission data 236, policies and permissions 254, and/or preferences 256 to enable hiding data content that may be copied into a clipboard history UI. For example, particular content items may be disabled from being pasted into any other location than the clipboard history UI. In some implementations, system 200 may employ other obfuscation techniques and/or rules to protect user data copied and stored on a clipboard history UI.

As shown in FIG. 12, three example clipboard history UIs include a different way of hiding, obfuscating, disabling, or otherwise protecting content items stored and rendered on the UIs. The three depicted UIs in screenshot 1200 are example options and typically a single clipboard history UI is presented based on system configurations, user permissions, etc.

A first example clipboard history UI 1202 includes a first text content item 1204, a first image content item 1206, a second image content item 1208, a second text content item 1210, and a link content item 1212. In this example, the second text content item 1210 is shown obfuscated with dots (e.g., obscured text) instead of text or data content. In addition, a no paste icon 1214 is depicted indicating to the user that the information is not configured to be pasted. For example, if a user selected content item 1210 to paste the item into a document, the system 200 may block the paste operation from occurring based on previously configured settings associated with the clipboard history UI 1202 or previously configured settings associated with the data content item 1210. A user may select a delete all item in UI 1202 to delete all items on the clipboard.

For example, the system 200 may prevent preview data associated with a content item to be overwritten when shown in a clipboard history UI. In this example, preview data may pertain to data that is viewable for a content item in the clipboard history UI. In operation, the system 200 may detect a copy operation associated with the clipboard history UI 1202 (content item 1210) and may overwrite particular preview data associated with the detected copy operation in response to detecting that the preview data is marked private. The overwriting obfuscates a preview of the data depicted in the clipboard history UI 1202 by replacing the actual data associated with the content item 1210 and rendering the clipboard history UI 1202 with the overwritten preview data instead of rendering at least one content item 1210 corresponding to the preview data.

A second example clipboard history UI 1218 is shown with another configurable option for a private non-paste enabled content item. In this example, a content item 1220 represents a file download that is shown with a file name to indicate confidentiality. The file name can indicate to a user accessing the clipboard that the file or contents of the file cannot be pasted into another location.

In operation, the system 200 may detect that a paste operation associated with the clipboard history UI 1218. For example, the system 200 may detect that a user entered a paste command when selecting content item 1220. In response to detecting that the content item 1220 is marked private, the system 200 may overwrite the content item 1220 in the UI 1218 (associated with the detected paste operation). The overwriting may obfuscate the content item 1220 when rendering the content item in an application receiving the paste operation. For example, the system 200 may indicate that the text content item 1220 is private by obfuscating some or all of the content item when displaying the item 1220 in the UI 1218. In addition, if the content item 1220 is allowed to be pasted into an application or document, for example, the paste operation may paste an indication or image that the item is not to be pasted. Thus, even if a paste operation cannot be prevented, generating a paste of the contents of the content item 1220 can be stopped.

A third example clipboard history UI 1222 is shown with another configurable option for a private non-paste enabled content item. Here, a content item 1224 is shown with a lock icon and obfuscated/obscured text indicates the content is private. A user may access the content by selecting the content item 1224 and entering a preconfigured password.

Figure 13:
FIG. 13 is a screenshot illustrating an example of providing suggestions using content stored on the clipboard history UI, in accordance with implementations described herein.

FIG. 13 is a screenshot 1300 illustrating an example of providing suggestions using content stored on the clipboard history UI, in accordance with implementations described herein. In this example, a user may be entering data into a purchase order. The purchase order may be online or offline. In some implementations, the purchase order may be entered in a browser 227. In some implementations, the purchase order may entered in an offline or online application. The system 200 (e.g., clip suggestion engine 220) may use the clipboard history UI 100 as a basis with which to provide suggested content within the purchase order, fields of the purchase order, overlaid on the purchase order, and the like.

The user entering the purchase order details may have copied or cut the content item 1302 in a previous application, document, or in a previous purchase order. The user may find it helpful to receive clipboard content items as suggestions to fill in forms, application content, etc. Thus, clip suggestion engine 220 may employ machine learning classifiers to determine a cursor focus of a particular input field (e.g., address field 1304). The determined input field may be used to assist in suggesting a relevant content item from the clipboard UI. For example, the clip suggestion engine 220 may determine that the address field 1304 is focused upon and may suggest a content item 1302 from a partial clipboard history UI 1306. The suggestion may be made at least in part on the content type of the content item. For example, only content items generated as a text content type may be suggested for input fields which require a text input. Other input fields including, but not limited to data, time, email, flight number, phone number, tracking numbers, URLs, etc. may be used as classifier input in order to determine suggestions from the clipboard history UI 100 for rendering in the UI or input field.

In some implementations, the UI 1306 may represent a portion of a clipboard history UI 100. In some implementations, a full or partial clipboard history UI 1306 may be rendered in a drop-down menu. In some implementations, a full or partial clipboard history UI 1306 may be rendered as an overlay to an active input field. In some implementations, the UI 1306 may include matching content to one or more user provided inputs in the input field 1304. For example, the user has typed "6" in the input field 1304. Content from the clipboard UI 100 that matches the input may be provided and selectable to autofill the input field 1304. In this example, the address content item 1302 and the address content item 1308 are provided because they both are on the clipboard UI 100 and match the user input in field 1304.

Figure 14:
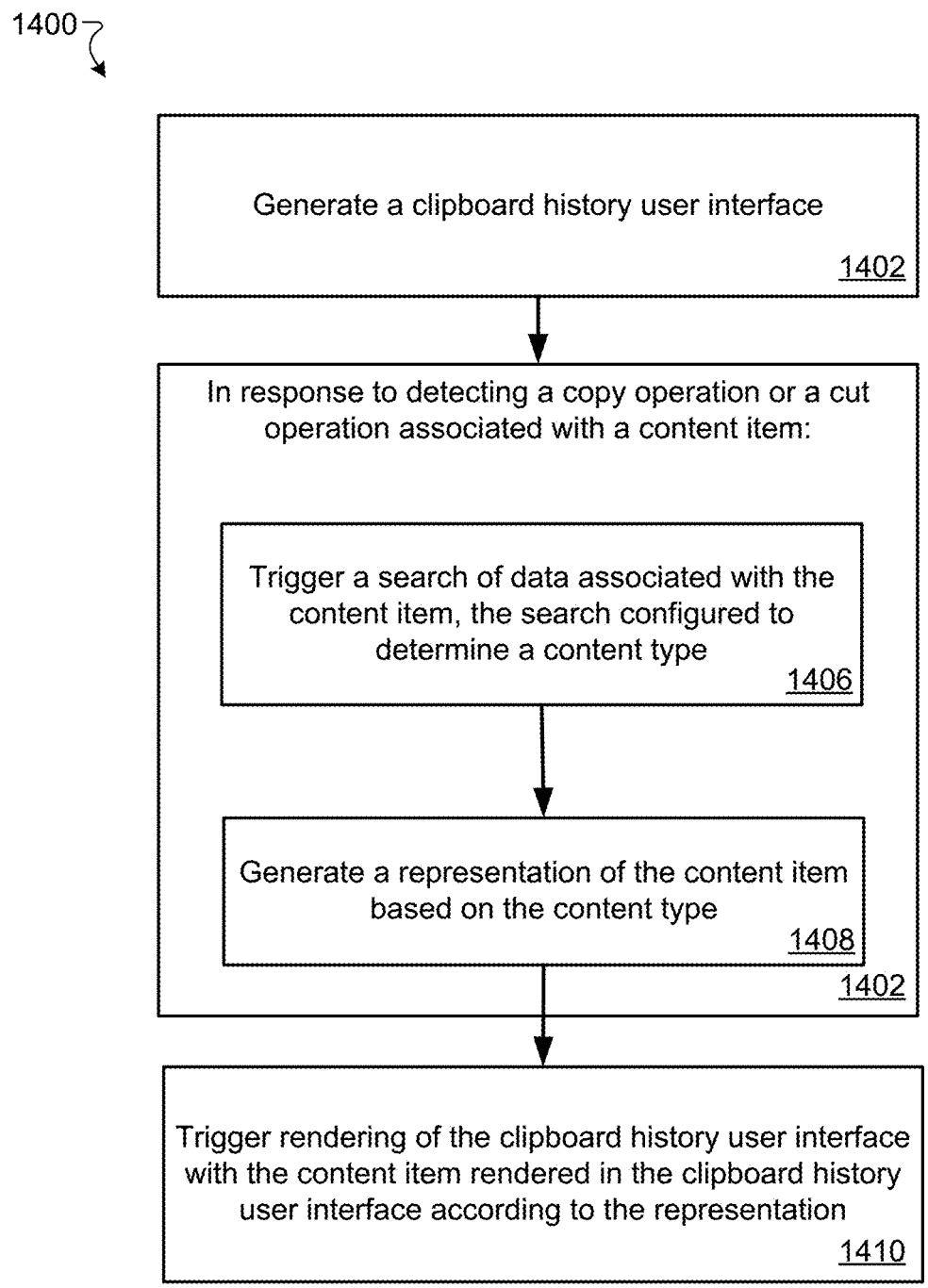
FIG. 14 is a flowchart of an example process of rendering a clipboard history user interface, in accordance with implementations described herein.

FIG. 14 is a flowchart of an example process 1400 of rendering a clipboard history UI, in accordance with implementations described herein. In general, process 1400 utilizes the systems and algorithms described herein to generate and render content items in a clipboard history UI 100. The process 1400 may utilize one or more computing systems with at least one processing device and memory storing instructions that when executed cause the processing device(s) to perform the plurality of operations and computer implemented steps described in the claims. In general, systems 200, and/or system 1500 may be used in the description and execution of process 1400.

At block 1402, the process 1400 includes generating a clipboard history user interface. The clipboard history UI may be configured to render a plurality of content items. For example, rather than conventional clipboards that house a most recently copied content item, the system 200 can generate a clipboard history UI 100 that is configured to render any number of content items. For example, system 200 (e.g., the clipboard history UI generator 206) may generate a clipboard history UI 100 to house any number of cut, copied, or downloaded content items. In operation, the clipboard history UI generator 206 may retrieve content items from an O/Sclipboard 104, the download repository 210, and/or the clipboard repository 212. In some implementations, the clipboard history UI 100 remains blank and not rendered until a user begins to capture content within a user session 230, for example. In some implementations, a system process associated with system 200 may generate the UI 100 (optionally including generating representations of the content items), but wait to display (i.e., render) the UI 100 and/or associated content items until the user triggers the UI 100 (e.g., requests viewing).

At block 1404, the process 1400 includes detecting a copy operation or a cut operation associated with a content item. For example, the clipboard history UI generator 206 may detect that a user is beginning to capture content for a clipboard. In response to the detection, the process 1400 may carry out blocks 1406-1410.

At block 1406, the process 1400 includes, responsive to detecting the copy or paste operation, triggering a search of data associated with the content item. The search may be configured to determine a content type. For example, the O/S 216 may invoke content manager 214 to generate a search to determine whether tagging language elements are associated with the content item. In particular, the search may find table tags or image tags in the content item to infer that the content item is HTML content (or other tagging language content). Similarly, the content manager 214 may perform a search that determines another pattern, such as a lack of tagging language elements to infer that plain text or image aspects are associated with the content item. In response, the content item may be generated for display according to such a pattern.

In some implementations, the search of data associated with the content item includes retrieving, from a buffer associated with the clipboard history UI 100, for example, tagging language information associated with the content item and determining whether the tagging language information includes at least one table tag or at least one image tag, or any other suitable tag. In some implementations, the search of the data associated with the content item includes determining whether to zoom or clip a portion of the content item and performing the zoom or clip of the portion of the content item to generate a scaled version of the content item in the rendered clipboard history user interface, in response to determining that the tagging language information includes at least one table tag or at least one image tag. Such a search may provide a way to modify the actual content item to ensure that the content item rendered in the UI 100 includes particular visual elements so that a user quickly recognizes the content. For example, a captured link may be provided in the UI 100, but an image shown at the captured link may provide an improved indication of what the link content is directed to.

At block 1408, the process 1400 includes, responsive to detecting the copy or paste operation, generating a representation of the content item based on the content type. For example, the content manager 214 may use the determined pattern (e.g., content type) from the search of the content item to generate the representation of the content item as a text content type in the clipboard history UI 100, in response to determining that the data associated with the content item does not include at least one table tag or at least one image tag. In such an example, the content manager 214 may determine that the content item includes text, but does not include markup language indicative of table tags and image tags. In some implementations, the content manager 214 may determine that an image is associated with the content item. If the image is a bitmap, the system 200 may generate the representation as a bitmap image. The representation of the text or image may be a partial or a full portion of the actual content item.

In some implementations, the content manager 214 may use the determined pattern (e.g., content type) from the search of the content item to generate the representation of the content item as a tagging language content type in the clipboard history UI 100, in response to determining that the data associated with the content item includes at least one table tag or at least one image tag. In this way, a table, or image or other tagging language content (such as HTML content) can be visually rendered within the UI 100.

At block 1410, the process 1400 further includes, triggering rendering of the clipboard history user interface with the content item rendered in the clipboard history UI 100 according to the representation. For example, a clipboard module (e.g., the clipboard history UI generator 206) may work with the content manager 214 and renderer 224 to ensure that the particular representation for each content item is rendered in the UI 100. In general, the content item may be rendered with other content items rendered in the clipboard history UI 100. The rendering of the clipboard history UI 100 may be triggered in response to detecting a paste operation. For example, if a user inputs a paste operation (e.g., a keyboard shortcut, a right click and paste selection, and the like), the clipboard module (e.g., the clipboard history UI generator 206) may trigger rendering of the full clipboard history UI 100 to provide easy access for user selection of additional content items. The paste operation may be detected and inferred by system 202 as an indicator that the user may wish to paste additional content items rendered in UI 100.

In some implementations, rendering the clipboard history UI 100 may include rendering a representation of each of multiple sets of content items according to the content type determined for each content item in the multiple sets of content items. For example, the system 202 may determine that a particular set of content items represent images while other sets of content items represent any or all of URLs, online documents, text content, file content, and the like. The system 202 may then render such different sets of content items in order to group the items by type. Within the grouped image sets, the particular content items (e.g., the representations of the content items) may be ordered according to system or user-provided rules. For example, the system may automatically group content items of the same type and order the items according to the date of capture (or UI population) of the content item. In some implementations, the system 202 may order content according to automated rules associated with the UI 100. In some implementations, the system 202 may provide automated recommendations for how to order the content items and/or automated recommendations for how to group the content items. In some implementations, a user may customize the grouping and/or ordering aspects of the content item rendering in order to accommodate user preferences and easy access to the content items. In general, the grouping may be determined by content manager 214, clipboard history UI generator 206, and/or policies and permissions 254.

In some implementations, the UI 100 may be rendered in response to detecting another suitable trigger (such as a user selection of an input field, in response to detecting a user input selecting the clipboard history UI 100, etc.). In some examples, the representation of the content item may be generated in advance and stored until rendering of the clipboard history UI 100 is triggered; this can reduce lag time in rendering the clipboard history user interface when the rendering is triggered.

In some implementations, the rendering of the clipboard history UI 100 may be triggered based on receiving an input from the user requesting to view the UI 100. For example, a menu selection of the UI 100, a keyboard shortcut to access the UI 100, or an inputted paste operation may trigger rendering the UI 100.

The content item and the other content items may be grouped together in the clipboard history UI 100 according to a corresponding copy operation or cut operation. For example, the content item and the other content items may be grouped according to a time of capture ensuring that all content items are uploaded and populated sequentially in the UI 100. In some implementations, the temporal proximity associated with content items may be used as a basis in which to group and/or otherwise render content items within UI 100.

In some implementations, any combination of grouping criteria can be used to group content items. For example, content items may be grouped according to content type, temporal proximity of the copy/cut operation, according to a day, week, month, year of capture, according to file type, author, application association, or any combination of the above.

In some implementations, the content items may be rendered in groups in the UI 100 according to content type. For example, each item type (text, image, file, table, online document, links, etc.) may be grouped together with other content items of the same type. For example, image content items may be grouped and presented together in a first area of UI 100 while text content items may be grouped together in a second area of UI 100.

In some implementations, the content items may be rendered in groups in the UI 100 according to a semantic understanding of the content items. For example, computing system 202 may determine contexts with respect to user access and use of particular content items. This context may be used as a basis in which to group and render content items in the UI 100. For example, the system 202 may determine and interpret which content items are often used (or recently used) in order to curate the UI 100 with the often used (or recently used) content items rendered in a conveniently selectable location in the UI 100.

In some implementations, the content items may be rendered in groups according to multiple rules and/or contexts. For example, the system 202 may be configured to render content items according to population time or sequence, content type, context, user-generated rules, semantic understanding of content items, and/or any combination thereof. User-generated rules may be used to determine an order of preference for how to group content items.

In some implementations, the content item and the other content items (e.g., sets of content items) are grouped in the clipboard history UI 100 according to a temporal proximity of the copy operation or the cut operation and/or a time period associated with capture of the content item or the other content items. In some implementations, the content item and the other content items are grouped in the clipboard history UI 100 according to a detected object represented in the content item or the other content items. For example, content items 1154 and 1156 (FIG. 11B) both include images of balloons. The system 202 may determine that the two content items 1154 and 1156 may be grouped together since they include similar content. In a similar fashion, the system 202 may determine other context or content similarities and may determine to group content items based on such context or similarities in order to render such content according to the determined grouping.

In some implementations, the content items may be rendered in the UI 100 based on the application(s) or documents being accessed at the time of rendering the UI 100. For example, the clipboard history UI 100 may render content items for convenient use order if the user is focusing a cursor on a particular input field, app, or document. For example, the process 1400 may detect a cursor at an input field, determine that the input field corresponds to at least one content item in the clipboard history UI 100, and may trigger rendering of the UI 100 by providing the clipboard history UI 100 as a menu adjacent to the input field. In some implementations, the UI 100 may also be presented with one or more content item marked for suggestion as input into the input field.

In some implementations, detecting an input on at least one rendered content item in the clipboard history may trigger generation of a preview of the at least one rendered content item and the preview may include a rendering that simulates a paste operation for the at least one content item. The simulation of the paste operation can then be displayed to the user to provide a visual indication of the result of the past operation. In some implementations, the clipboard history UI 100 is configured to include content items retrieved from two or more user profiles associated with a user with access to the clipboard history user interface.

In some implementations, the clipboard history UI 100 configured to enable multi-item operations. For example, the user may use UI 100 to perform a multi-item copy operation, a multi-item paste operation, and a multi-item rendering operation where each of the multi-item operations are configured to be triggered by a single input detected at the clipboard history user interface. For example, a select all operation may be performed with one key in order to paste all contents from the UI 100 into a focused upon document, input field, website, etc.

Multiple content items may be added to UI 100 over time as a user continues to copy/cut/download content. For example, for each subsequent detected copy operation or cut operation associated with a respective content item, the system 200 may trigger a search of data associated with the respective content item, and generate a respective representation of the respective content item based on the search of data. The respective representations may be stored until rendering of the clipboard history user interface is subsequently triggered, or in some examples each subsequent detected copy operation may trigger rendering of the UI 100 with the respective content item rendered according to the respective representation.

In some implementations, each respective content item captured into the UI 100 may be rendered using a single browser process that generates an O/S-based virtual digital clipboard 274, for example. The use of a single browser process can reduce runtime and system memory usage as compared to starting a new browser process for each rendering of tagging language content. The virtual digital clipboard 274 may be generated by any process triggered by the O/S. The virtual digital clipboard is typically invisible and used to store, track, populate, and update the content item and each respective content item rendered in the clipboard history UI 100. For example, as a user continues to capture content items for presentation on the clipboard history UI 100, the virtual digital clipboard 274 may track, modify, and move content items around virtually in order to allow for a user command to copy and/or paste multiple contents or out of order contents. The virtual digital clipboard 274 may represent a mapping of items in UI 100 without having to visually modify UI 100. In some implementations, content items from clipboard 274 are copied to UI 100 when a user inputs a requested change to the UI 100 (e.g., delete item, add item, paste item, etc.).

Figure 15:
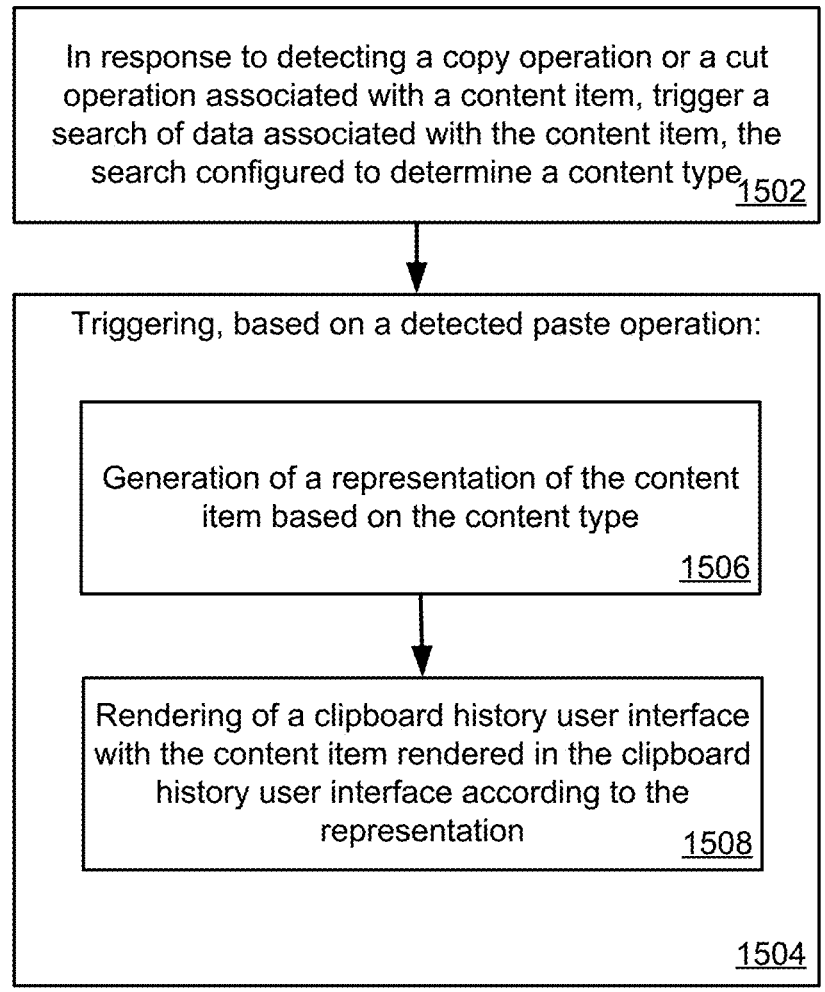
FIG. 15 is a flowchart of an example process of rendering a clipboard history user interface, in accordance with implementations described herein.

FIG. 15 is a flowchart of an example process 1500 of rendering a clipboard history UI, in accordance with implementations described herein. In general, process 1500 utilizes the systems and algorithms described herein to generate and render content items in a clipboard history UI 100. The process 1500 may utilize one or more computing systems with at least one processing device and memory storing instructions that when executed cause the processing device(s) to perform the plurality of operations and computer implemented steps described in the claims. In general, systems 200, and/or system 1600 may be used in the description and execution of process 1500. In some implementations, the clipboard history UI generator 206 functions with renderer 224 to carry out the process 1500.

At block 1502, the process 1500 includes detecting a copy operation or a cut operation associated with a content item. For example, the clipboard history UI generator 206 may detect that a user is beginning to capture content for a clipboard. In response to the detection, the process 1500 may trigger a search of data associated with the content item to be performed. The search may be configured to determine a content type of the content item. For example, the O/S 216 may invoke content manager 214 to generate a search to determine whether tagging language elements are associated with the content item. In particular, the search may find tagging information (e.g., table tags or image tags) in the content item to infer that the content item is HTML content (or other tagging language content). Similarly, the content manager 214 may perform a search that determines another pattern, such as a lack of tagging language elements to infer that plain text or image aspects are associated with the content item. In response, a representation of the content item may be generated for display according to such a pattern.

In some implementations, the search of data associated with the content item includes retrieving, from a buffer associated with the clipboard history UI 100, for example, tagging language information associated with the content item and determining whether the tagging language information includes at least one table tag or at least one image tag, or any other suitable tag. In some implementations, the search of the data associated with the content item includes determining whether to zoom or clip a portion of the content item and performing the zoom or clip of the portion of the content item to generate a scaled version of the content item in the rendered clipboard history user interface, in response to detecting tagging language information associated with the content item. Such a search may provide a way to modify the actual content item to ensure that the content item rendered in the UI 100 includes particular visual elements so that a user quickly recognizes the content. For example, a captured link may be provided in the UI 100, but an image shown at the captured link (e.g., the representation in the UI 100) may provide an improved indication of what the link content is directed to.

At block 1506 and responsive to detecting a paste operation at block 1504, the process 1500 includes generating a representation of the content item based on the content type. For example, the content manager 214 may use the determined pattern (e.g., content type) from the search of the content item to generate a text representation of the content item, in response to determining that the data associated with the content item does not include at least one table tag or at least one image tag. In such an example, the content manager 214 may determine that the content item includes text, but does not include markup language indicative of table tags and image tags (or other tags). In some implementations, the content manager 214 may determine that an image is associated with the content item. If the image is a bitmap, the system 200 may generate the representation as a bitmap image. The representation of the text or image may be a partial or a full portion of the actual content item. In some implementations, the representation may include other identifying data associated with the content item In some implementations, the content manager 214 may use the determined pattern (e.g., content type) from the search of the content item to generate a tagging language representation of the content item, in response to determining that the data associated with the content item includes at least one table tag or at least one image tag. In this way, a table, or image or other tagging language content (such as HTML content) can be visually rendered within the UI 100.

At block 1508 and responsive to detecting the paste operation at block 1504, the process 1500 includes rendering of a clipboard history user interface with the content item rendered in the clipboard history user interface according to the representation where the content item is rendered with other content items rendered in the clipboard history user interface. For example, a clipboard module (e.g., the clipboard history UI generator 206) may work with the content manager 214 and renderer 224 to ensure that the particular representation for each content item is rendered in the UI 100. In general, the content item may be rendered with other content items rendered in the clipboard history UI 100. The rendering of the clipboard history UI 100 may be triggered in response to detecting a paste operation. For example, if a user inputs a paste operation (e.g., a keyboard shortcut, a right click and paste selection, and the like), the clipboard module (e.g., the clipboard history UI generator 206) may trigger rendering of the full clipboard history UI 100 to provide easy access for user selection of additional content items. The paste operation may be detected and inferred by system 202 as an indicator that the user may wish to paste additional content items rendered in UI 100.

In some implementations, rendering the clipboard history UI 100 may include rendering a representation of each of multiple sets of content items according to the content type determined for each content item in the multiple sets of content items. For example, the system 202 may determine that a particular set of content items represent images while other sets of content items represent any or all of URLs, online documents, text content, file content, and the like. The system 202 may then render such different sets of content items in order to group the items by type. Within the grouped image sets, the particular content items (e.g., the representations of the content items) may be ordered according to system or user-configured rules. For example, the system may automatically group content items of the same type and order the items according to the date of capture (or UI population) of the content item. In some implementations, the system 202 may order content according to automated rules associated with the UI 100. In some implementations, the system 202 may provide automated recommendations for how to order the content items and/or automated recommendations for how to group the content items. In some implementations, a user may customize the grouping and/or ordering aspects of the content item rendering in order to accommodate user preferences and easy access to the content items. In general, the grouping may be determined by content manager 214, clipboard history UI generator 206, and/or policies and permissions 254.

In some implementations, the UI 100 may be rendered in response to detecting another suitable trigger (such as a user selection of an input field, in response to detecting a user input selecting the clipboard history UI 100, etc.). In some examples, the representation of the content item may be generated in advance and stored until rendering of the clipboard history UI 100 is triggered; this can reduce lag time in rendering the clipboard history user interface when the rendering is triggered. In some implementations, the rendering of the clipboard history UI 100 may be triggered based on receiving an input from the user requesting to view the UI 100. For example, a menu selection of the UI 100, a keyboard shortcut to access the UI 100, or an inputted paste operation may trigger rendering the UI 100.

In some implementations, the content item and the other content items may be grouped together in the clipboard history UI 100 according to a corresponding copy operation or cut operation. For example, the content item and the other content items may be grouped according to a time of capture ensuring that all content items are uploaded and populated sequentially in the UI 100. In some implementations, the temporal proximity associated with content items may be used as a basis in which to group and/or otherwise render content items within UI 100.

In some implementations, any combination of grouping criteria can be used to group content items. For example, content items may be grouped according to content type, temporal proximity of the copy/cut operation, according to a day, week, month, year of capture, according to file type, author, application association, or any combination of the above.

In some implementations, the content items may be rendered in groups in the UI 100 according to content type. For example, each item type (text, image, file, table, online document, links, etc.) may be grouped together with other content items of the same type. For example, image content items may be grouped and presented together in a first area of UI 100 while text content items may be grouped together in a second area of UI 100.

In some implementations, the content items may be rendered in groups in the UI 100 according to a semantic understanding of the content items. For example, computing system 202 may determine contexts with respect to user access and use of particular content items. This context may be used as a basis in which to group and render content items in the UI 100. For example, the system 202 may determine and interpret which content items are often used (or recently used) in order to curate the UI 100 with the often used (or recently used) content items rendered in a conveniently selectable location in the UI 100.

In some implementations, the content items may be rendered in groups according to multiple rules and/or contexts. For example, the system 202 may be configured to render content items according to population time or sequence, content type, context, user-generated rules, semantic understanding of content items, and/or any combination thereof. User-generated rules may be used to determine an order of preference for how to group content items.

In some implementations, the content item and the other content items (e.g., sets of content items) are grouped in the clipboard history UI 100 according to a temporal proximity of the copy operation or the cut operation and/or a time period associated with capture of the content item or the other content items. In some implementations, the content item and the other content items are grouped in the clipboard history UI 100 according to a detected object represented in the content item or the other content items. For example, content items 1154 and 1156 (FIG. 11B) both include images of balloons. The system 202 may determine that the two content items 1154 and 1156 may be grouped together since they include similar content. In a similar fashion, the system 202 may determine other context or content similarities and may determine to group content items based on such context or similarities in order to render such content according to the determined grouping.

In some implementations, the content items may be rendered in the UI 100 based on the application(s) or documents being accessed at the time of rendering the UI 100. For example, the clipboard history UI 100 may render content items for convenient use order if the user is focusing a cursor on a particular input field, app, or document. For example, the process 1500 may detect a cursor at an input field, determine that the input field corresponds to at least one content item in the clipboard history UI 100, and may trigger rendering of the UI 100 by providing the clipboard history UI 100 as a menu adjacent to the input field. In some implementations, the UI 100 may also be presented with one or more content item marked for suggestion as input into the input field.

In some implementations, detecting an input on at least one rendered content item in the clipboard history may trigger generation of a preview of the at least one rendered content item and the preview may include a rendering that simulates a paste operation for the at least one content item. The simulation of the paste operation can then be displayed to the user to provide a visual indication of the result of the past operation. In some implementations, the clipboard history UI 100 is configured to include content items retrieved from two or more user profiles associated with a user with access to the clipboard history user interface.

In some implementations, the clipboard history UI 100 configured to enable multi-item operations. For example, the user may use UI 100 to perform a multi-item copy operation, a multi-item paste operation, and a multi-item rendering operation where each of the multi-item operations are configured to be triggered by a single input detected at the clipboard history user interface. For example, a select all operation may be performed with one key in order to paste all contents from the UI 100 into a focused upon document, input field, website, etc.

Multiple content items may be added to UI 100 over time as a user continues to copy/cut/download content. For example, for each subsequent detected copy operation or cut operation associated with a respective content item, the system 200 may trigger a search of data associated with the respective content item, and generate a respective representation of the respective content item based on the search of data. The respective representations may be stored until rendering of the clipboard history user interface is subsequently triggered, or in some examples each subsequent detected copy operation may trigger rendering of the UI 100 with the respective content item rendered according to the respective representation.

In some implementations, each respective content item captured into the UI 100 may be rendered using a single browser process that generates an O/S-based virtual digital clipboard 274, for example. The use of a single browser process can reduce runtime and system memory usage as compared to starting a new browser process for each rendering of tagging language content. The virtual digital clipboard 274 may be generated by any process triggered by the O/S. The virtual digital clipboard is typically invisible and used to store, track, populate, and update the content item and each respective content item rendered in the clipboard history UI 100. For example, as a user continues to capture content items for presentation on the clipboard history UI 100, the virtual digital clipboard 274 may track, modify, and move content items around virtually in order to allow for a user command to copy and/or paste multiple contents or out of order contents. The virtual digital clipboard 274 may represent a mapping of items in UI 100 without having to visually modify UI 100. In some implementations, content items from clipboard 274 are copied to UI 100 when a user inputs a requested change to the UI 100 (e.g., delete item, add item, paste item, etc.).

Figure 16:
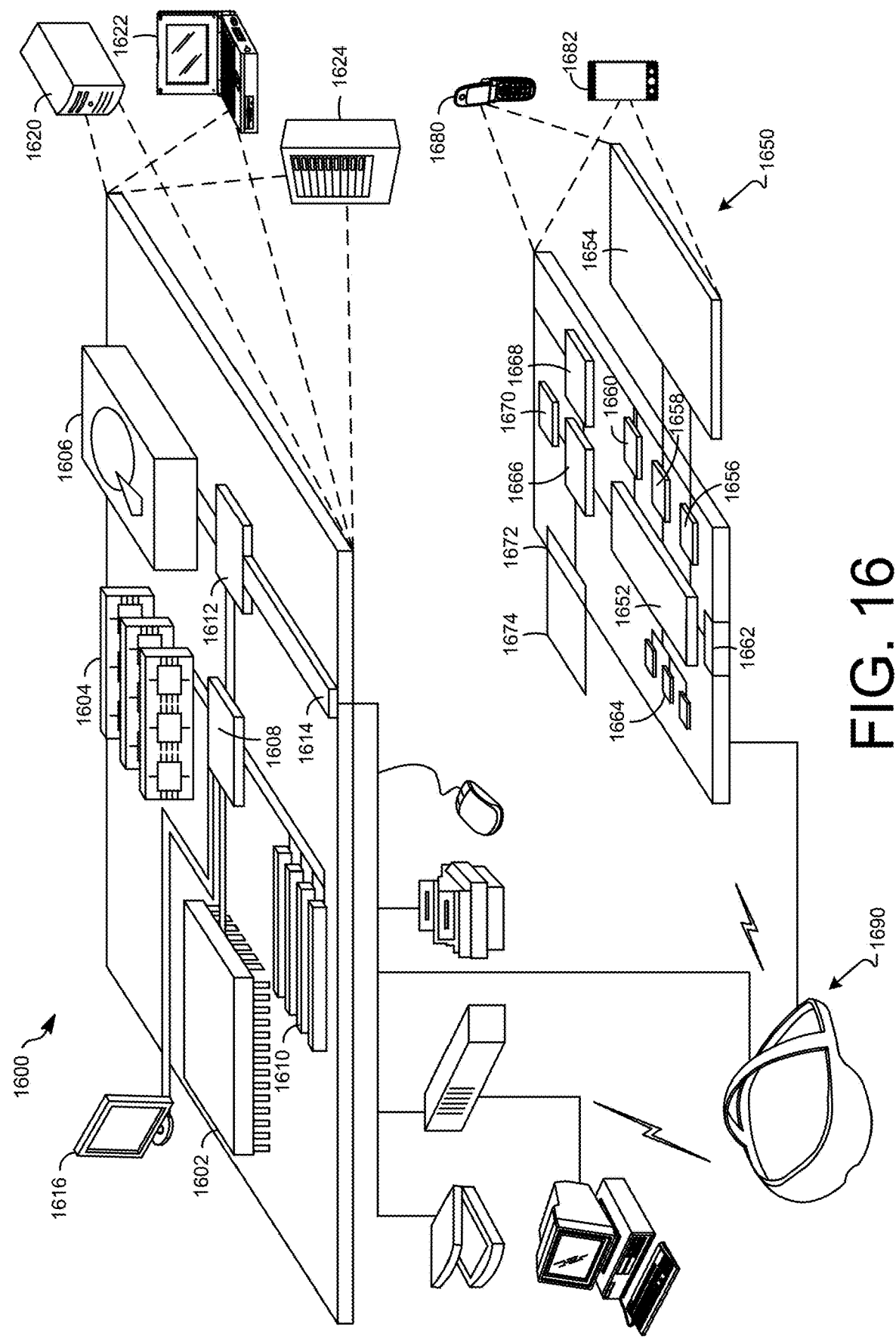
FIG. 16 shows an example of a computer device and a mobile computer device that can be used to implement the techniques described herein.

FIG. 16 shows an example of a computer device 1600 and a mobile computer device 1650, which may be used with the techniques described here. Computing device 1600 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 1650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1600 includes a processor 1602, memory 1604, a storage device 1606, a high-speed interface 1608 connecting to memory 1604 and high-speed expansion ports 1610, and a low speed interface 1612 connecting to low speed bus 1614 and storage device 1606. The processor 1602 can be a semiconductor-based processor. The memory 1604 can be a semiconductor-based memory. Each of the components 1602, 1604, 1606, 1608, 1610, and 1612, are interconnected using various busses, and may be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as display 1616 coupled to high speed interface 1608. In other implementations, multiple processors and/or multiple buses may be used, as appropriate, along with multiple memories and types of memory. Also, multiple computing devices 1600 may be connected, with each device providing portions of the necessary operations (e.g., as a server bank, a group of blade servers, or a multi-processor system).

The memory 1604 stores information within the computing device 1600. In one implementation, the memory 1604 is a volatile memory unit or units. In another implementation, the memory 1604 is a non-volatile memory unit or units. The memory 1604 may also be another form of computer-readable medium, such as a magnetic or optical disk. In general, the computer-readable medium may be a non-transitory computer-readable medium.

The storage device 1606 is capable of providing mass storage for the computing device 1600. In one implementation, the storage device 1606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 1604, the storage device 1606, or memory on processor 1602.

The high speed controller 1608 manages bandwidth-intensive operations for the computing device 1600, while the low speed controller 1612 manages lower bandwidth-intensive operations. Such allocation of functions is exemplary only. In one implementation, the high-speed controller 1608 is coupled to memory 1604, display 1616 (e.g., through a graphics processor or accelerator), and to high-speed expansion ports 1610, which may accept various expansion cards (not shown). In the implementation, low-speed controller 1612 is coupled to storage device 1606 and low-speed expansion port 1614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1620, or multiple times in a group of such servers. It may also be implemented as part of a rack server system 1624. In addition, it may be implemented in a computer such as a laptop computer 1622. Alternatively, components from computing device 1600 may be combined with other components in a mobile device (not shown), such as device 1650. Each of such devices may contain one or more of computing device 1600, 1650, and an entire system may be made up of multiple computing devices 1600, 1650 communicating with each other.

Computing device 1650 includes a processor 1652, memory 1664, an input/output device such as a display 1654, a communication interface 1666, and a transceiver 1668, among other components. The device 1650 may also be provided with a storage device, such as a microdrive or other device, to provide additional storage. Each of the components 1650, 1652, 1664, 1654, 1666, and 1668, are interconnected using various buses, and several of the components may be mounted on a common motherboard or in other manners as appropriate.

The processor 1652 can execute instructions within the computing device 1650, including instructions stored in the memory 1664. The processor may be implemented as a chipset of chips that include separate and multiple analog and digital processors. The processor may provide, for example, for coordination of the other components of the device 1650, such as control of user interfaces, applications run by device 1650, and wireless communication by device 1650.

Processor 1652 may communicate with a user through control interface 1658 and display interface 1656 coupled to a display 1654. The display 1654 may be, for example, a TFT LCD (Thin-Film-Transistor Liquid Crystal Display) or an OLED (Organic Light Emitting Diode) display, or other appropriate display technology. The display interface 1656 may comprise appropriate circuitry for driving the display 1654 to present graphical and other information to a user. The control interface 1658 may receive commands from a user and convert them for submission to the processor 1652. In addition, an external interface 1662 may be provided in communication with processor 1652, so as to enable near area communication of device 1650 with other devices. External interface 1662 may provide, for example, for wired communication in some implementations, or for wireless communication in other implementations, and multiple interfaces may also be used.

The memory 1664 stores information within the computing device 1650. The memory 1664 can be implemented as one or more of a computer-readable medium or media, a volatile memory unit or units, or a non-volatile memory unit or units. Expansion memory 1674 may also be provided and connected to device 1650 through expansion interface 1672, which may include, for example, a SIMM (Single In Line Memory Module) card interface. Such expansion memory 1674 may provide extra storage space for device 1650, or may also store applications or other information for device 1650. Specifically, expansion memory 1674 may include instructions to carry out or supplement the processes described above, and may include secure information also. Thus, for example, expansion memory 1674 may be provided as a security module for device 1650, and may be programmed with instructions that permit secure use of device 1650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1664, expansion memory 1674, or memory on processor 1652, that may be received, for example, over transceiver 1668 or external interface 1662.

Device 1650 may communicate wirelessly through communication interface 1666, which may include digital signal processing circuitry where necessary. Communication interface 1666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1668. In addition, short-range communication may occur, such as using a Bluetooth, Wi-Fi, or other such transceiver (not shown). In addition, GPS (Global Positioning System) receiver module 1670 may provide additional navigation- and location-related wireless data to device 1650, which may be used as appropriate by applications running on device 1650.

Device 1650 may also communicate audibly using audio codec 1660, which may receive spoken information from a user and convert it to usable digital information. Audio codec 1660 may likewise generate audible sound for a user, such as through a speaker, e.g., in a handset of device 1650. Such sound may include sound from voice telephone calls, may include recorded sound (e.g., voice messages, music files, etc.) and may also include sound generated by applications operating on device 1650.

The computing device 1650 may be implemented in a number of different forms, as shown in the figure. For example, it may be implemented as a cellular telephone 1680. It may also be implemented as part of a smart phone 1682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 16 can include sensors that interface with a virtual reality or headset (VR headset/AR headset/HMD device 1690). For example, one or more sensors included on computing device 1650 or other computing device depicted in FIG. 16, can provide input to AR/VR headset 1690 or in general, provide input to an AR/VR space. The sensors can include, but are not limited to, a touchscreen, accelerometers, gyroscopes, pressure sensors, biometric sensors, temperature sensors, humidity sensors, and ambient light sensors. Computing device 1650 can use the sensors to determine an absolute position and/or a detected rotation of the computing device in the AR/VR space that can then be used as input to the AR/VR space. For example, computing device 1650 may be incorporated into the AR/VR space as a virtual object, such as a controller, a laser pointer, a keyboard, a weapon, etc. Positioning of the computing device/virtual object by the user when incorporated into the AR/VR space can allow the user to position the computing device to view the virtual object in certain manners in the AR/VR space.

In some embodiments, one or more input devices included on, or connect to, the computing device 1650 can be used as input to the AR/VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1650 when the computing device is incorporated into the AR/VR space can cause a particular action to occur in the AR/VR space.

In some embodiments, one or more output devices included on the computing device 1650 can provide output and/or feedback to a user of the AR/VR headset 1690 in the AR/VR space. The output and feedback can be visual, tactical, or audio. The output and/or feedback can include, but is not limited to, rendering the AR/VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 1650 can be placed within AR/VR headset 1690 to create an AR/VR system. AR/VR headset 1690 can include one or more positioning elements that allow for the placement of computing device 1650, such as smart phone 1682, in the appropriate position within AR/VR headset 1690. In such embodiments, the display of smart phone 1682 can render stereoscopic images representing the AR/VR space or virtual environment.

In some embodiments, the computing device 1650 may appear as another object in a computer-generated, 3D environment. Interactions by the user with the computing device 1650 (e.g., rotating, shaking, touching a touchscreen, swiping a finger across a touch screen) can be interpreted as interactions with the object in the AR/VR space. As just one example, computing device can be a laser pointer. In such an example, computing device 1650 appears as a virtual laser pointer in the computer-generated, 3D environment. As the user manipulates computing device 1650, the user in the AR/VR space sees movement of the laser pointer. The user receives feedback from interactions with the computing device 1650 in the AR/VR environment on the computing device 1650 or on the AR/VR headset 1690.

In some embodiments, a computing device 1650 may include a touchscreen. For example, a user can interact with the touchscreen in a particular manner that can mimic what happens on the touchscreen with what happens in the AR/VR space. For example, a user may use a pinching-type motion to zoom content displayed on the touchscreen. This pinching-type motion on the touchscreen can cause information provided in the AR/VR space to be zoomed. In another example, the computing device may be rendered as a virtual book in a computer-generated, 3D environment. In the AR/VR space, the pages of the book can be displayed in the AR/VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR/VR space to control objects in the AR/VR space.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer-implemented method comprising:
    detecting a copy operation or a cut operation associated with a content item, the copy operation or the cut operation being associated with a user and a corresponding user profile, of a plurality of user profiles, of an operating system;
    triggering a search of data associated with the content item in response to detecting the copy operation or the cut operation, the search configured to determine a content type based on tagging language information associated with the content item detected in the search;
    triggering, in response to a detected paste operation:
        generating of a representation of the content item based on the content type; and
        rendering of a clipboard history user interface configured to enable a multi-item operation triggered by a single input,
        the clipboard history user interface being associated with the user profile of the operating system, the clipboard history user interface including a plurality of content items including the content item rendered in the clipboard history user interface according to the representation and other content items;
    detecting a selection of multiple content items from the clipboard history user interface; and
    triggering a multi-item paste operation associated with the user profile of the operating system for the multiple content items in response to the detected paste operation,
    wherein the plurality of content items included in the clipboard history user interface are copied, cut or downloaded from at least one application, are stored by the operating system in association with the user profile, are available to the user associated with the user profile from the operating system for pasting into at least one other application in response to the detected paste operation, and are inaccessible to users not associated with the user profile.

2. The computer-implemented method of claim 1, wherein rendering of the clipboard history user interface includes rendering a representation of multiple subsets of content items of the plurality of content items according to the content type determined for the multiple subsets of content items.

3. The computer-implemented method of claim 1, wherein the plurality of content items are grouped in the clipboard history user interface according to:
    a temporal proximity of the copy operation or the cut operation; or
    a time period associated with capture of the plurality of content items.

4. The computer-implemented method of claim 1, wherein the plurality of content items are grouped in the clipboard history user interface according to a detected object represented in the plurality of content items.

5. The computer-implemented method of claim 1, wherein generating a representation of the content item based on the content type includes:
    generating a text representation of the content item, in response to determining that the data associated with the content item does not include at least one table tag or at least one image tag; and
    generating a tagging language representation of the content item, in response to determining that the data associated with the content item includes at least one table tag or at least one image tag.

6. The computer-implemented method of claim 1, further comprising:
    detecting a cursor at an input field;
    determining that the input field corresponds to at least one content item in the clipboard history user interface; and
    wherein triggering the rendering of the clipboard history user interface includes providing the rendering of the clipboard history user interface as an element adjacent to the input field, the clipboard history user interface including at least one of the plurality of content items marked for suggestion as input into the input field.

7. The computer-implemented method of claim 1, wherein:
    generating the representation of the content item based on the content type includes determining whether to perform a zoom operation or a clip operation on a portion of the content item and performing the zoom operation or the clip operation on the portion of the content item to generate a scaled version of the content item in the rendering of the clipboard history user interface, in response to detecting the tagging language information associated with the content item.

8. The computer-implemented method of claim 1, further comprising:
    in response to detecting an input on at least one content item in the clipboard history user interface, generating a preview of the at least one content item, the preview including a rendering that simulates a paste operation for the at least one content item.

9. The computer-implemented method of claim 1, wherein the clipboard history user interface is configured to include content items retrieved from two or more user profiles associated with the user with access to the clipboard history user interface, and wherein the clipboard history user interface does not include content items associated with other user profiles of the plurality of user profiles of the operating system that are inaccessible to the user.

10. The computer-implemented method of claim 1, wherein the multi-item operation includes at least one of a multi-item copy operation, a multi-item paste operation, or a multi-item rendering operation, the multi-item operation configured to be triggered by the single input in response to being detected at the clipboard history user interface.

11. The computer-implemented method of claim 1, further comprising:
  detecting a second paste operation associated with the clipboard history user interface; and
  overwriting the content item associated with the second paste operation in response to detecting that the content item is marked private, wherein overwriting the content item obfuscates the content item when rendering the content item in an application receiving the second paste operation.

12. The computer-implemented method of claim 1, further comprising:
  detecting a copy operation associated with the clipboard history user interface;
  overwriting preview data associated with the copy operation in response to detecting that the preview data is marked private to generate overwritten preview data, wherein overwriting the preview data obfuscates a preview of the data depicted in the clipboard history user interface; and
  rendering the clipboard history user interface with the overwritten preview data instead of rendering at least one content item corresponding to the preview data.

13. The computer-implemented method of claim 1, further comprising:
  for each subsequent detected copy operation or cut operation associated with a respective content item:
    triggering a search of data associated with the respective content item, the search of data configured to determine whether the data includes at least one tag; and
    generating a respective representation of the respective content item based on the search of data; and
    triggering rendering of the clipboard history user interface with each respective content item rendered according to the respective representation.

14. The computer-implemented method of claim 13, wherein the plurality of content items are rendered using a single process that generates an operating-system based virtual digital clipboard configured to represent the plurality of content items rendered in the clipboard history user interface.

15. A non-transitory computer-readable storage medium comprising instructions stored thereon that, when executed by at least one processor, are configured to cause a computing system to at least:
  generate a clipboard history user interface;
  in response to detecting a copy operation or a cut operation associated with a content item:
    trigger a search of data associated with the content item, the search configured to determine a content type associated with the content item based on tagging language information associated with the content item from the search of the data associated with the content item; and
    generate a representation of the content item based on the content type; and
  trigger rendering of the clipboard history user interface including a plurality of content items, the plurality of content items including the content item and other content items rendered in the clipboard history user interface, the clipboard history user interface being configured to enable a multi-item operation triggered by a single input, the plurality of content items including content items retrieved from two or more user profiles associated with a user and stored by an operating system of the computing system,
  wherein the multi-item operation includes a multi-item paste operation for pasting of multiple content items selected form the clipboard history user interface, and
  wherein the plurality of content items included in the clipboard history user interface are copied, cut, or downloaded from at least one application, are stored by the operating system, and are available to the user having access to the two or more user profiles from the operating system for pasting into at least one other application in response to the multi-item paste operation and are inaccessible to users not associated with the two or more user profiles.

16. The non-transitory computer-readable storage medium of claim 15, wherein the instructions are configured to cause the computing system to render the clipboard history user interface in response to detection of a paste operation.

17. The non-transitory computer-readable storage medium of claim 15, wherein the instructions are configured to cause the computing system to generate the representation of the content item based on the content type, including:
  generate a text representation of the content item, in response to determining that the data associated with the content item does not include at least one table tag or at least one image tag; and
  generate a tagging language representation of the content item, in response to determining that the data associated with the content item includes at least one table tag or at least one image tag.

18. The non-transitory computer-readable storage medium of claim 15, wherein the instructions are further configured to cause the computing system to:
  detect a cursor at an input field; and
  determine that the input field corresponds to at least one of the plurality of content items in the clipboard history user interface; and
  wherein triggering the rendering of the clipboard history user interface includes providing the clipboard history user interface as an element adjacent to the input field, the clipboard history user interface including the at least one of the plurality of content items marked for suggestion as input into the input field.

19. The non-transitory computer-readable storage medium of claim 15, wherein the instructions are configured to cause the computing system to:
  search the data associated with the content item, including:
    retrieve, from a buffer associated with the clipboard history user interface, the tagging language information associated with the content item; and
    determine whether the tagging language information includes at least one table tag or at least one image tag; and
  generate the representation of the content item based on the content type, including:
    determine whether to perform a zoom operation or a clip operation on a portion of the content item; and
    perform the zoom operation or the clip operation on the portion of the content item to generate a scaled version of the content item in the clipboard history user interface, in response to determining that the tagging language information includes at least one table tag or at least one image tag.

20. The non-transitory computer-readable storage medium of claim 15, wherein the instructions are further configured to cause the computing system to:
  detect an input on at least one of the plurality of content items in the clipboard history user interface; and
  generate a preview of the at least one of the plurality of content items in response to detecting the preview including a rendering that simulates a paste operation for the at least one of the plurality of content items rendered in the clipboard history user interface.

21. The non-transitory computer-readable storage medium of claim 15, wherein the clipboard history user interface is configured to enable multi-item operations, the multi-item operations including a multi-item copy operation, a multi-item paste operation, and a multi-item rendering operation, each of the multi-item operations configured to be triggered by a single input detected at the clipboard history user interface.

22. The non-transitory computer-readable storage medium of claim 15, wherein the instructions are further configured to cause the computing system to:
  detect a copy operation associated with the clipboard history user interface;
  overwrite preview data associated with the copy operation in response to detecting that the preview data is marked private to generate overwritten preview data, wherein overwriting the preview data obfuscates a preview of the data depicted in the clipboard history user interface; and
  render the clipboard history user interface with the overwritten preview data instead of rendering at least one content item corresponding to the preview data.

23. The non-transitory computer-readable storage medium of claim 15, wherein the instructions are further configured to cause the computing system to:
  for each subsequent detected copy operation or cut operation associated with a respective content item:
    trigger a search of data associated with the respective content item, the search of data configured to determine whether the data includes at least one table tag or at least one image tag;
    generate a respective representation of the respective content item based on the search of data; and
    trigger rendering of the clipboard history user interface with each respective content item rendered according to the respective representation.

24. A computer-implemented method comprising:
  detecting a copy operation or a cut operation associated with a user profile of a plurality of user profiles of an operating system;
  rendering of a clipboard history user interface associated with the user profile of the operating system and configured to enable a multi-item operation triggered by a single input, the clipboard history user interface including a plurality of content items including a content item associated with the copy operation or the cut operation, the plurality of content items of the clipboard history user interface being accessible to the user associated with the user profile and inaccessible to users not associated with the user profile, wherein the multi-item operation includes a multi-item paste operation associated with the user profile of the operating system for pasting of multiple content items selected from the clipboard history user interface;
  detecting a cursor at an input field;
  determining that the input field corresponds to at least one of the plurality of content items in the clipboard history user interface; and
  marking at least one of the plurality of content items included in the clipboard history user interface as a suggested input into an input field.

25. The computer-implemented method of claim 24, wherein rendering the clipboard history user interface includes:
  generating a representation of the content item;
  determining whether to perform a zoom operation or a clip operation on a portion of the content item; and
  performing the zoom operation or the clip operation on the portion of the content item to generate a scaled version of the content item in the clipboard history user interface, in response to detecting tagging language information associated with the content item.

26. The computer-implemented method of claim 24, further comprising:
  generating a preview of at least one of the plurality of content items in response to detecting an input on the at least one of the plurality of content items in the clipboard history user interface, the preview including a rendering that simulates a paste operation for the at least one of the plurality of content items.

27. The computer-implemented method of claim 24, wherein the clipboard history user interface is configured to include content items retrieved from two or more user profiles associated with a user having access to the clipboard history user interface, and wherein the clipboard history user interface does not include content items associated with other user profiles of a plurality of user profiles of the operating system that are inaccessible to the user.

28. The computer-implemented method of claim 24, wherein the multi-item operation includes at least one of a multi-item copy operation, a multi-item paste operation, or a multi-item rendering operation, wherein the multi-item operation is configured to be triggered by the single input in response to being detected at the clipboard history user interface.

29. The computer-implemented method of claim 24, further comprising:
  detecting a paste operation associated with one of the plurality of content items; and
  triggering overwriting of the one of the plurality of content items associated with the paste operation in response to detecting that the one of the plurality of content items is marked private, wherein the overwriting obfuscates the one of the plurality of content items when rendering the one of the plurality of content items in an application receiving the paste operation.

30. The computer-implemented method of claim 1, wherein the content type is a text content type or a bitmap content type.

31. The computer-implemented method of claim 24, wherein the plurality of content items included in the clipboard history user interface are copied, cut or downloaded from at least one application, and are stored by the operating system, are available to the user having access to the user profile from the operating system for pasting into at least one other application in response to the multi-item paste operation, and are inaccessible to users not associated with the user profile.

32. The computer-implemented method of claim 24, wherein determining that the input field corresponds to the at least one of the plurality of content items included in the clipboard history user interface for marking as the suggested input into the input field is based on tagging language information associated with the at least one of the plurality of content items.

* * * * *